United States Patent [19]
Sarac

[11] Patent Number: 5,295,119
[45] Date of Patent: Mar. 15, 1994

[54] PROXIMITY DEVICE

[76] Inventor: Vinko Sarac, 2 Kelly Ridge Rd., Carmel, N.Y. 10512

[21] Appl. No.: 933,757

[22] Filed: Aug. 24, 1992

[51] Int. Cl.⁵ .................... G01S 15/42; G01S 13/42
[52] U.S. Cl. .................... 367/99; 367/96; 364/516; 342/146
[58] Field of Search ............ 367/99, 89, 90, 91, 367/96; 364/516, 561; 342/107, 139, 146

[56] References Cited

U.S. PATENT DOCUMENTS 4,079,352  3/1978  Burckhardt et al. ............ 367/99
5,025,425  6/1991  Suter ........................ 367/96

*Primary Examiner*—Daniel T. Pihulic
*Attorney, Agent, or Firm*—Hoffmann & Baron

[57] ABSTRACT

A proximity device for use in determining a distance and an angular displacement between the proximity device and an object or nearest surface of an object whereby alignment can be implemented. The proximity device contains a transmitter section for transmitting signal energy, an energy source for outputting the signal energy, a dual-channel receiver section, a plurality of energy sensors for receiving signal energy reflected from an object or nearest surface of an object and a channel-control section. Within the dual-channel receiver section there are means for determining the relative distance and an angular displacement to the object or surface of the object from the reflected signal energy.

27 Claims, 17 Drawing Sheets

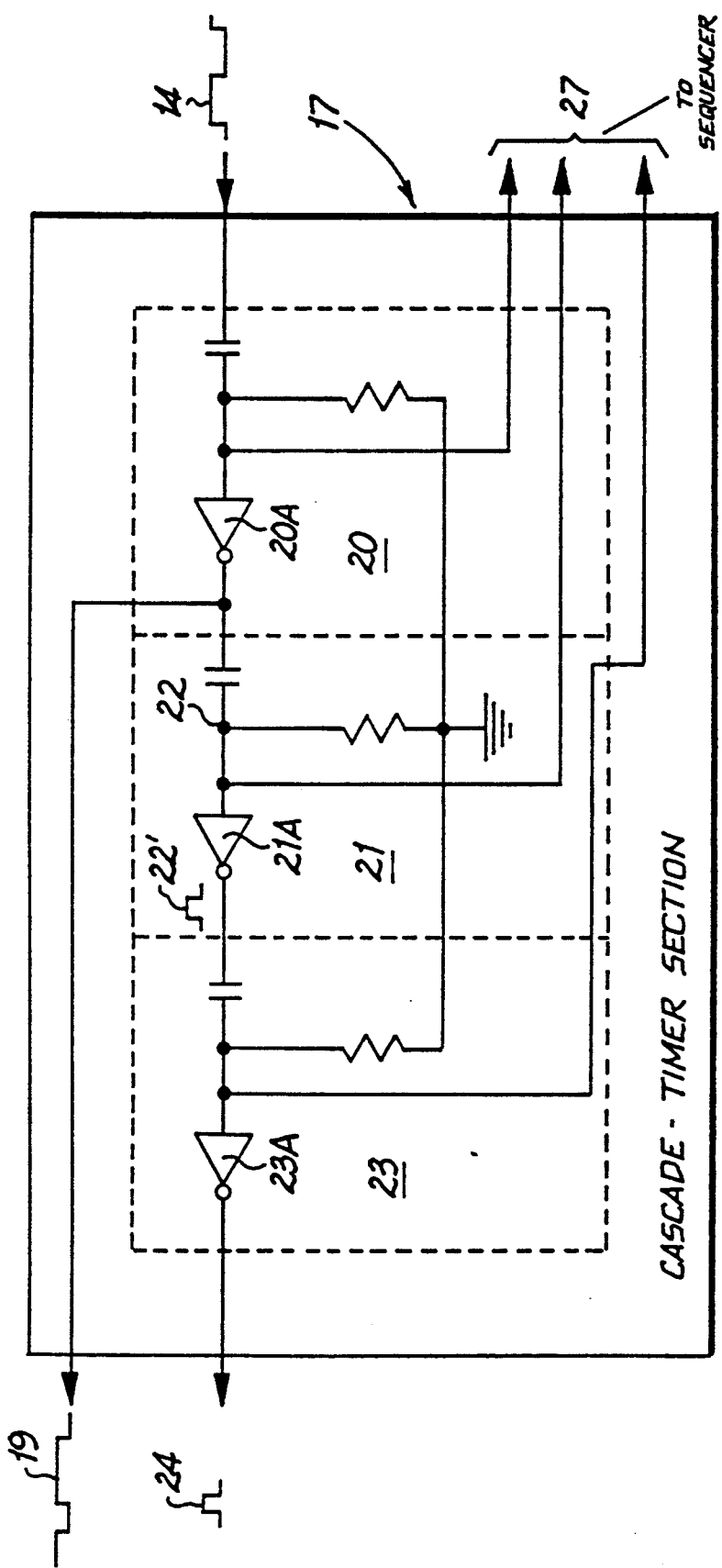
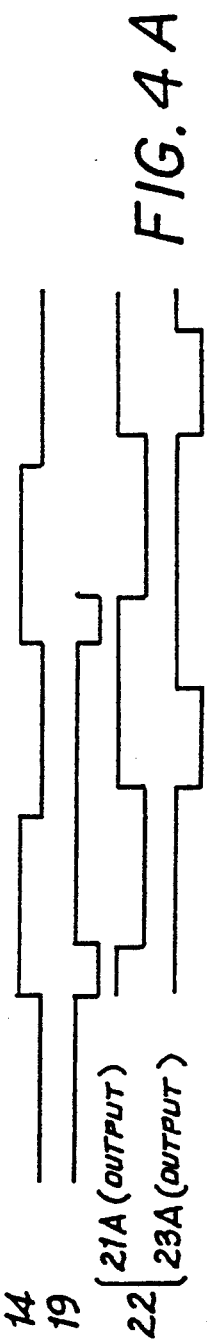
FIG. 4
FIG. 4A

PROXIMITY DEVICE

BACKGROUND OF THE INVENTION

The present invention relates to a device for determining the direction of and distance to an object. More particularly, the present invention is a device capable of determining the distance to the nearest object or nearest surface of an object relative to the proximity device, the angular displacement thereto, and of enabling a tracking system to track the same.

OBJECTS AND SUMMARY OF THE INVENTION

Accordingly, it is an object of the present invention to provide a device for determining the direction of and distance to an object and more particularly, to provide a device capable of determining the nearest object or nearest surface of an object relative to the proximity device and the angular displacement thereto.

It is another object of the present invention to provide a proximity device which determines the angular displacement and relative distance to an object or nearest surface of an object only when the object or nearest surface of the object falls within a scanning range relative to the proximity device.

It is a further object of the invention to provide a proximity device for determining a distance and an angular displacement to an object or nearest surface of an object thereby enabling a tracking system to track the same, consisting of a transmitter section for transmitting an energy signal, an energy source for outputting the energy signal, a dual-channel receiver section, a plurality of energy sensors for receiving signal energy reflected from an object or nearest surface of an object and a channel-control section within the dual-channel receiver section wherein a relative distance to and an angular displacement from an object or nearest surface of an object is determined.

The transmitter section consists of an signal energy source, a frequency-scaler section coupled to the signal energy source, means for controlling system timing coupled to the frequency-scaler section wherein a plurality of timing control signals are defined, a sequence generator wherein a plurality of signals are formed for use in accordance with a variety of distances of operation between an object or nearest surface of an object and the proximity device, an communication section, a control selection switch, means for sensing a relative change in speed between an object or nearest surface of an object and the proximity device, a transmitter-driver section and means for outputting the signal energy wherein the frequency-scaler section defines the length of the signal energy output in accordance with the plurality of signals formed within the sequence generator.

The dual-channel receiver section further consists of a port for receiving a gating control signal from the transmitter section, a duality of signal processing channels each comprising a detector section, a comparison and timer section, and a delay section, wherein each of the signal processing channels receive and process a reflected energy signal received by one of the energy sensors, means to control the signal processing channels whereby a relative distance and an angular displacement to an object or nearest surface of an object is determined, means to output a signal for communicating the relative distance and the angular displacement to an object or nearest surface of an object, and means to output a signal enabling the aligning system to track an object or nearest surface of an object.

According to another embodiment of the present invention, there is provided a proximity device wherein there are two sonic transducers coupled to the transmitter section therein.

According to still yet another embodiment of the present invention, there is provided a receiver, the receiver having a first and a second channel section, each channel section containing a detector section for detecting a received energy signal, a comparison and timer section coupled to the detector section and a delay section coupled to the comparison and timer section to delay processing the received energy signal for a predetermined time delay. The channel that detects the received energy signal first controls operation of the other channel. Also included are means to control the first and second channels whereby a relative distance to and angular displacement from an object or nearest surface of an object is determined and means for outputting at least one signal for communicating the relative distance and angular displacement. Means may also be included for providing a signal for directing an alignment system to track the signal energy source.

According to yet another embodiment of the present invention, there are two separate and distinct transmitting sections (with sonic transducers), each transmitting section positioned stationarily at a predetermined position in space. A receiving section within the proximity device receives two distinct energy signals at two distinct receivers within the receiver section, the energy signals transmitted from each of these transmitting devices and determines the distance to and angular displacement from a normal positioned at a midpoint to a line extending between the receiving devices.

The above, and other objects, features and advantages of the present invention will become apparent from the following description or examples read in conjunction with the accompanying drawings, in which like reference numerals designate the same elements.

BRIEF DESCRIPTION OF THE DRAWINGS

FIG. 4 describes the cascade-timer section within the transmitter section of the present invention.

FIG. 4A is a diagram of several timing signal waveforms developed within the present invention.

DETAILED DESCRIPTION OF PREFERRED EMBODIMENTS

The proximity device of the present invention is described in terms of the preferred embodiments thereof as a multi-channel transceiver device capable of transmitting an energy signal from a single or multiple source within a transmitter section of the device, receiving signal energy reflected by the nearest object or nearest surface of an object to the device falling within a predetermined angular scanning range (see FIG. 16), determining a distance to and an angular displacement of the object relative to the proximity device, and aligning the device to the same.

It will be appreciated by those skilled in the art that the proximity device of the present invention can be used in many other applications not specifically referred to in a description of the preferred embodiments, such as aerospace, underwater acoustics, fiber optics, airborne radar, etc.

Figure 1:
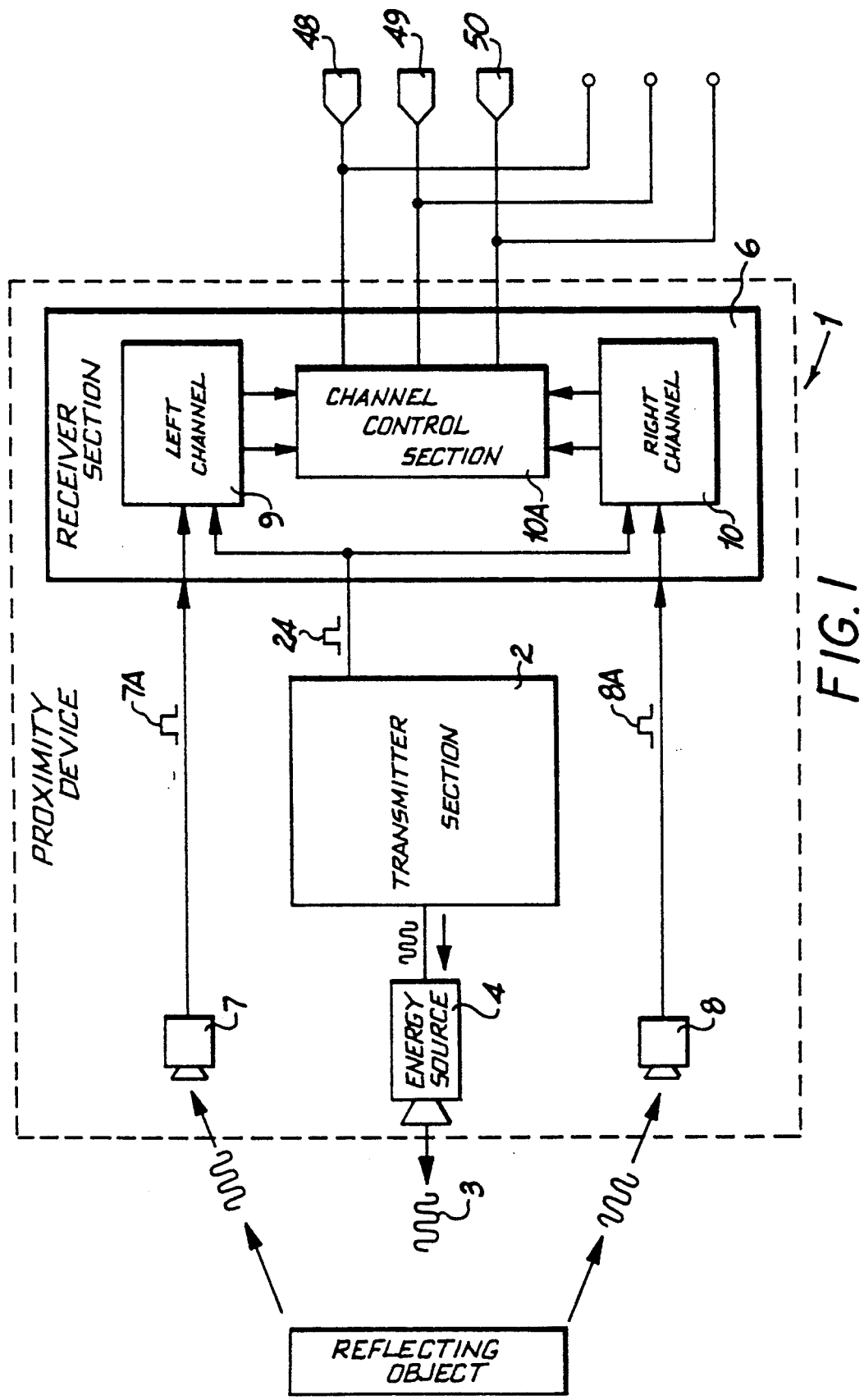
FIG. 1 is a system-level depiction of the proximity device of the present invention.

With reference to FIG. 1, system level operation of an embodiment of the proximity device of the present invention will now be described.

A receiver section 6 has two distinct channels, a left channel 9 and a right channel 10, which operate in accordance with control logic of a channel control section 10A. Receiver section 6 is coupled to a transmitter section 2.

The transmitter section 2 acts as an signal energy source whereby a carrier-frequency signal 13 is output through a sonic transducer 4. Ideally, part of a carrier-frequency signal 13 output will be reflected by an object, or nearest surface of an object in space falling within a predetermined angular scanning range, back to the proximity device and received by the receiver section 6. Carrier-frequency signal 13 is generated within an oscillator/frequency scaler 5 (described in greater detail below).

Receiver section 6 receives the reflected signal at any or all of a plurality of sonic sensors. In the present embodiment, a left sonic sensor 7 and a right sonic sensor 8 are used, corresponding respectively to a left channel 9 and a right channel 10. The reflected signal energy received within the left and right channels 9 and 10, is amplified and processed whereby the channel nearest to the object reflecting the signal energy, the distance to the object, and the angular direction to the object are determined.

Figure 2:
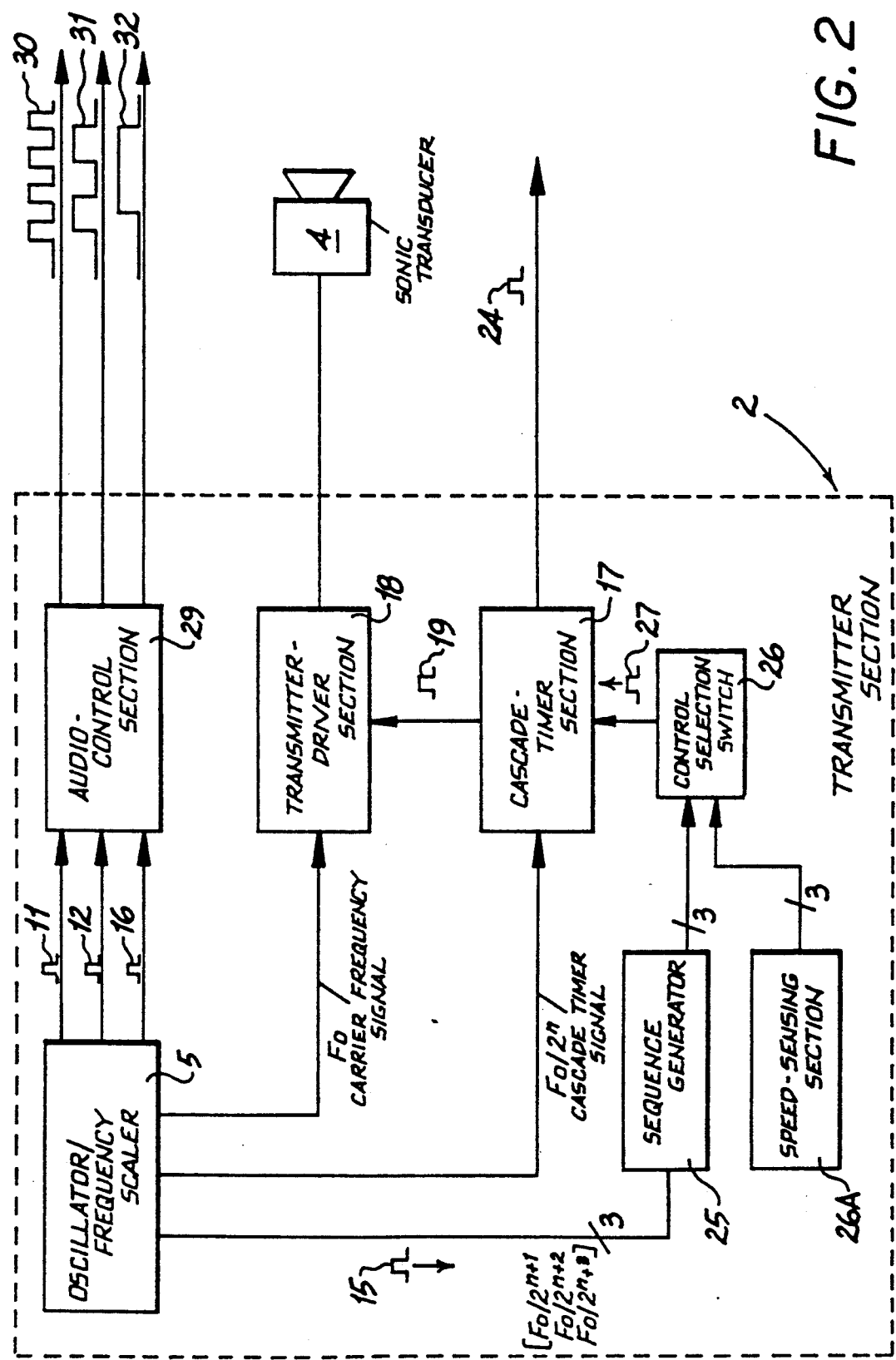
FIG. 2 depicts the transmitter section of the proximity device of the present invention.

Referring to FIG. 2, the transmitter section 2 of the present invention will now be described.

An oscillator/frequency scaler 5 contains a 40 KHz crystal source (not shown) which provides the carrier-frequency signal 13 as well as (through scaling) a plurality of synchronized timing signals required for each stage of proximity device operation. The synchronized timing signals of each stage are programmed outputs of the 40 Khz source, formed by dividing down the 40 KHz source signal by different powers of 2, i.e., 40 $KHz/2^n$.

A plurality of outputs of the oscillator/frequency scaler 5 include a carrier-frequency signal 13 coupled to a transmitter-driver section 18, a cascade-timer signal 14 coupled to a cascade-timer section 17, and a sequence-generator input 15 coupled to a sequence generator 25. Further, left-audio input 11, mid-audio input 12, right-audio input 16 are coupled into an audio-control section 29 within the receiver section 6, discussed in greater detail below.

Figure 3:
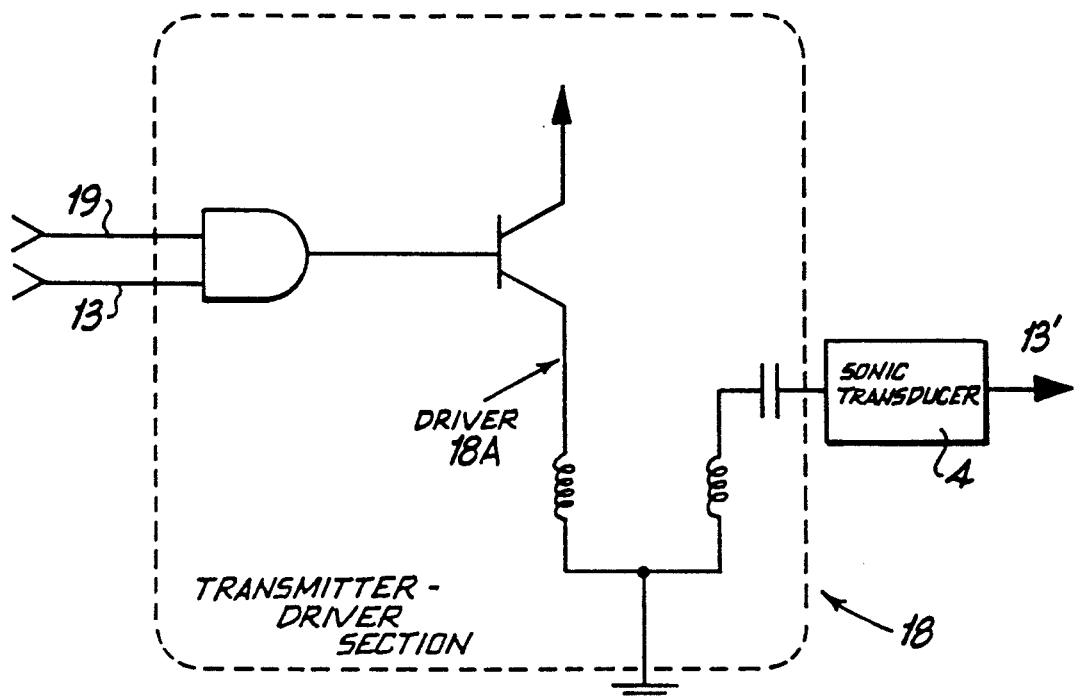
FIG. 3 describes the transmitter-driver section within the transmitter section of the present invention.

Referring to FIG. 3, the transmitter-driver section 18 of the present invention will now be described.

Transmitter-driver section 18 drives a sonic transducer 4 in order to produce a pulsed output 13' for projection at a target. Transmitter-driver section 18 receives carrier frequency signal 13 and a transmit-key signal 19 (to be discussed in greater detail below) in order to pulse modulate the carrier-frequency signal 13. The pulse modulated carrier-frequency signal is coupled to driver section 18A, which amplifies the signal to the appropriate level to drive sonic transducer 4 and produce the pulsed output 13'.

Referring to FIGS. 4 and 4A, a cascade-timer section 17 of the present invention will now be described.

Figure 19:
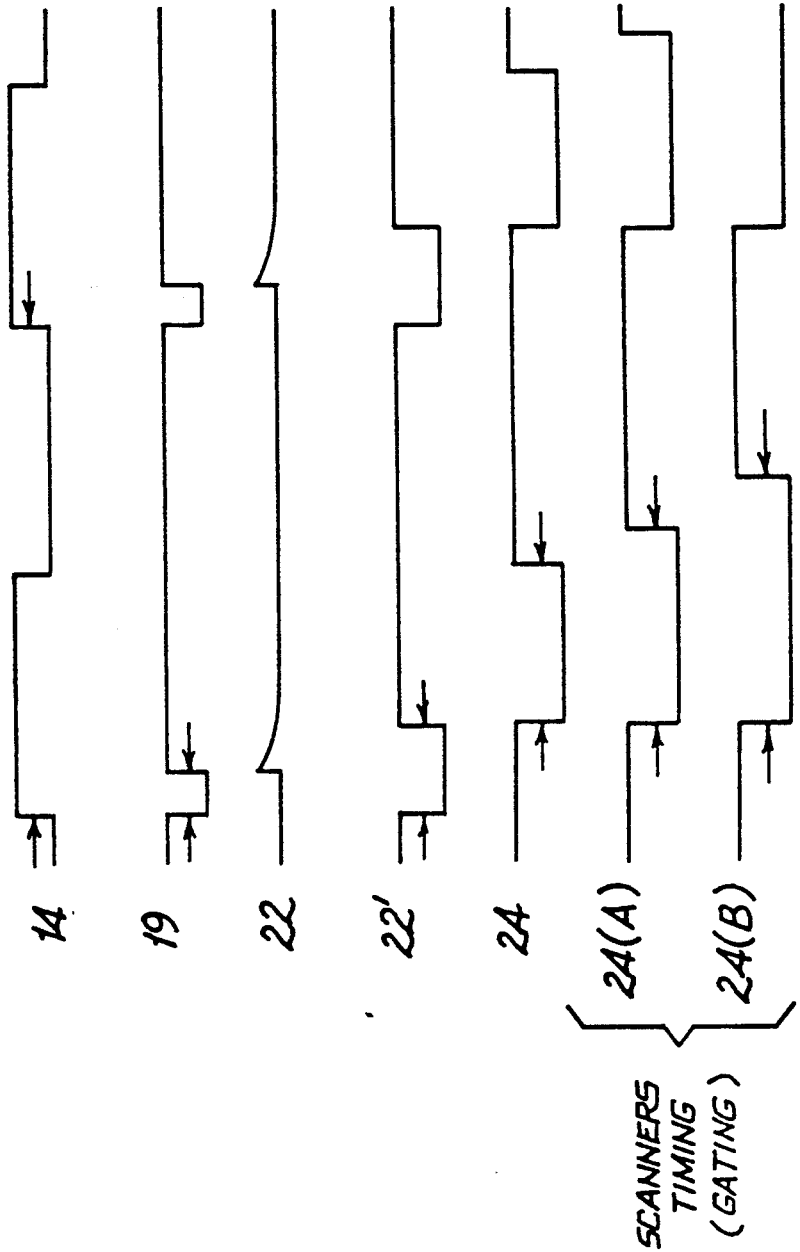
FIG. 19 shows timing signals output from both the cascade timer section and the sequencer-generator.

The cascade-timer section 17 controls the timing involved in producing the transmit-key signal 19 blanking-delay signal 22 and a gating signal 24, used in the receiver section. (See also timing signals depicted in FIG. 19).

Cascade-timer section 17 receives cascade timer signal 14 from oscillator/frequency scaler 5. Cascade timer signal is delayed and inverted, forming transmit-key signal 19 (which defines the pulse-width of the pulsed output 13').

Formation of transmit-key signal 19 is as follows. Cascade timer signal 14 is differentiated using a time delay defined by a first RC-delay section 20. The delayed signal is then inverted with an invertor 20A, thereby defining a negative pulse which comprises the transmit-key signal 19.

Transmit-key signal 19 is also coupled to a second RC-delay section 21. RC-delay section 21 is triggered by the rising edge of transmit-key signal 19. Therein, transmit-key signal 19 is delayed. The delayed signal, delay signal 22, is inverted by invertor 21A resulting in blanking delay signal 22'.

The delay time created within second RC-delay section 21, inherent in blanking delay signal 22', is used to blank (disable) receiver channels of the receiver section 6. Blanking is required because of ringing produced by sonic transducer 4. Ringing is a condition which occurs in sonic transducer 4 where a signal continues to be output for some time after application of a drive signal due to inherent characteristics of the transducer. The delay signal 22 also serves to delay a gate of the receiver section 6 so as to examine echoes from a desired distance.

Blanking delay signal 22' is coupled to a third RC-delay section 23. Within the third RC-delay section 23, blanking delay signal 22' is differentiated by yet another R-C section 23. The time constant of R-C section 23 defines a pulse inverted by invertor 23A and output as gating signal 24.

Gating signal 24 is used for controlling the signal processing and blanking within the receiver section 6. The gating signal 24 defines a window in time, after the pulsed output 13' is sent, during which the receiver accepts return echoes.

RC delay sections 20, 21 and 23 are each connected via control lines 27 and control selection switch 26 to a sequence-generator section 25 (shown in FIG. 5) or, in the alternative to a speed sensing section 26A. The control lines 27 permit the sequence-generator 25, or the speed sensing section 26A, to vary the RC time constant of each section, and thus, the width of the pulse produced by each section. Varying the pulse width of transmit-key signal 19, blanking delay signal 22' and the gating signal 24 produces modes of operation dependent upon a desired range of detection or speed of the proximity device 1.

Therefore, when a detection is made, the distance of the object detected to the proximity device 1 is determinable from the mode of operation into which the sequence-generator 25 has placed the cascade timer section 17. Logic circuitry may be employed to latch the mode of operation (the logic state of the sequence generator signals) when a detection is made and then indicate a range of distance for the detection.

Figure 5:
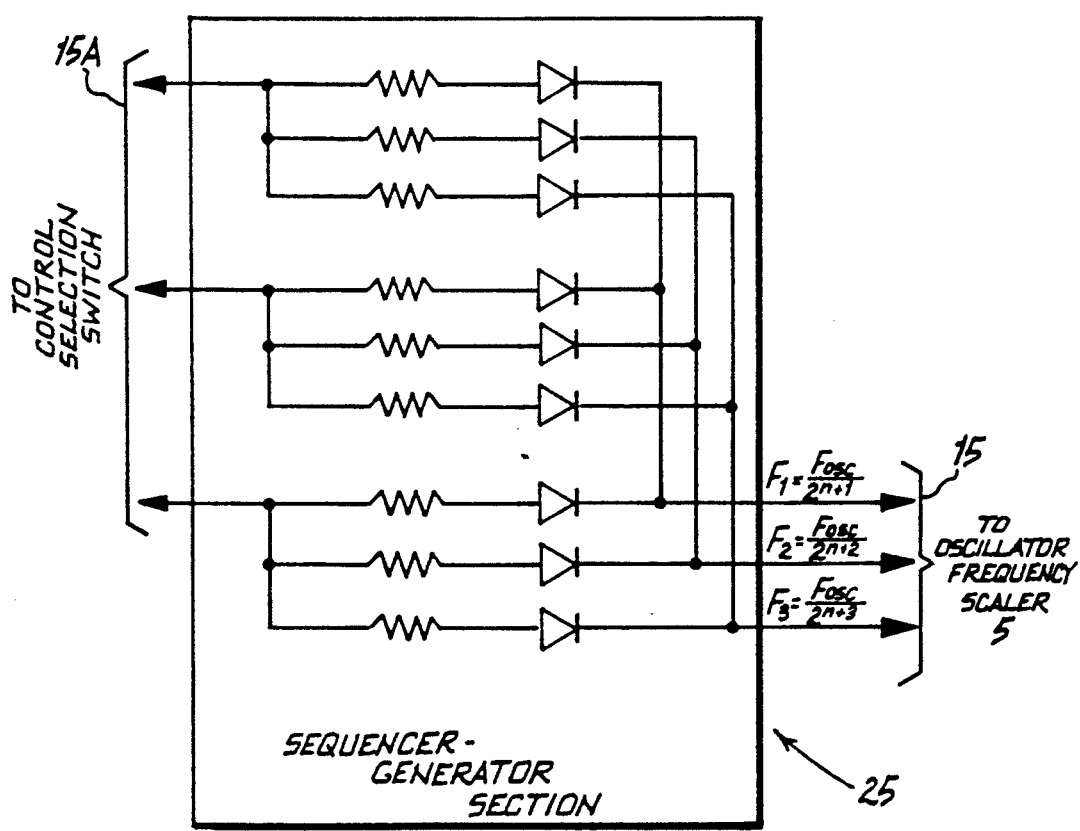
FIG. 5 describes the sequence-generator section within the transmitter section of the present invention.

Referring to FIG. 5, the sequence-generator section 25 is shown in detail. (See also timing signals depicted in FIG. 19).

The sequence-generator section 25 has a plurality of sequence-generator connections 15A for modifying the time constants. Thus, the lengths of the signals defined within cascade-timer section 17 are also modified, thereby providing gating signal 24 with the correct system timing.

Resistor-diode combinations have digital signals applied thereto consisting of frequencies which are binaryly divided down from the cascade timer signal having a frequency of $F/2^n$. When a given resistor-diode combination has a low-level digital signal applied it modifies the time constant of the RC delay section to which it is connected.

Each resistor diode combination of a given group has a frequency applied that is half that of the one above it. There are three groups, one for each RC delay section. The sequence generator shown has groups of three resistor-diode series combinations thus giving rise to $2^3$, or 8 possible timing modes of operation. Due to the synchronous counting nature of the three sequence generator signals applied, each successive output pulse may have a different timing mode applied to its detection.

It is apparent to one skilled in the art that this sequencing may be controlled by the addition of logic circuitry to permit one given mode to be maintained, the modes to be scanned at a programmed rate, or for the modes to be scanned until a detection is made. Furthermore, the number resistor-diode combinations may be increased or decreased dependent upon the number of modes of operation and the resolution of the range detection desired.

For example, the transmitter section 2 and receiver section 6 may be mounted on the back of an automobile to discern the distance between the automobile and objects directly behind it. In such a case, a shorter output signal pulse 13' provides equivalent accuracy during processing in relation to a distance within a three foot range as compared to the longer signal length required for processing within a thirty foot range when backing up. Due to the nature of the resonant build-up in the sonic transducer 4, a longer pulse results in greater energy being produced and a resultant greater range of detection.

Figure 6:
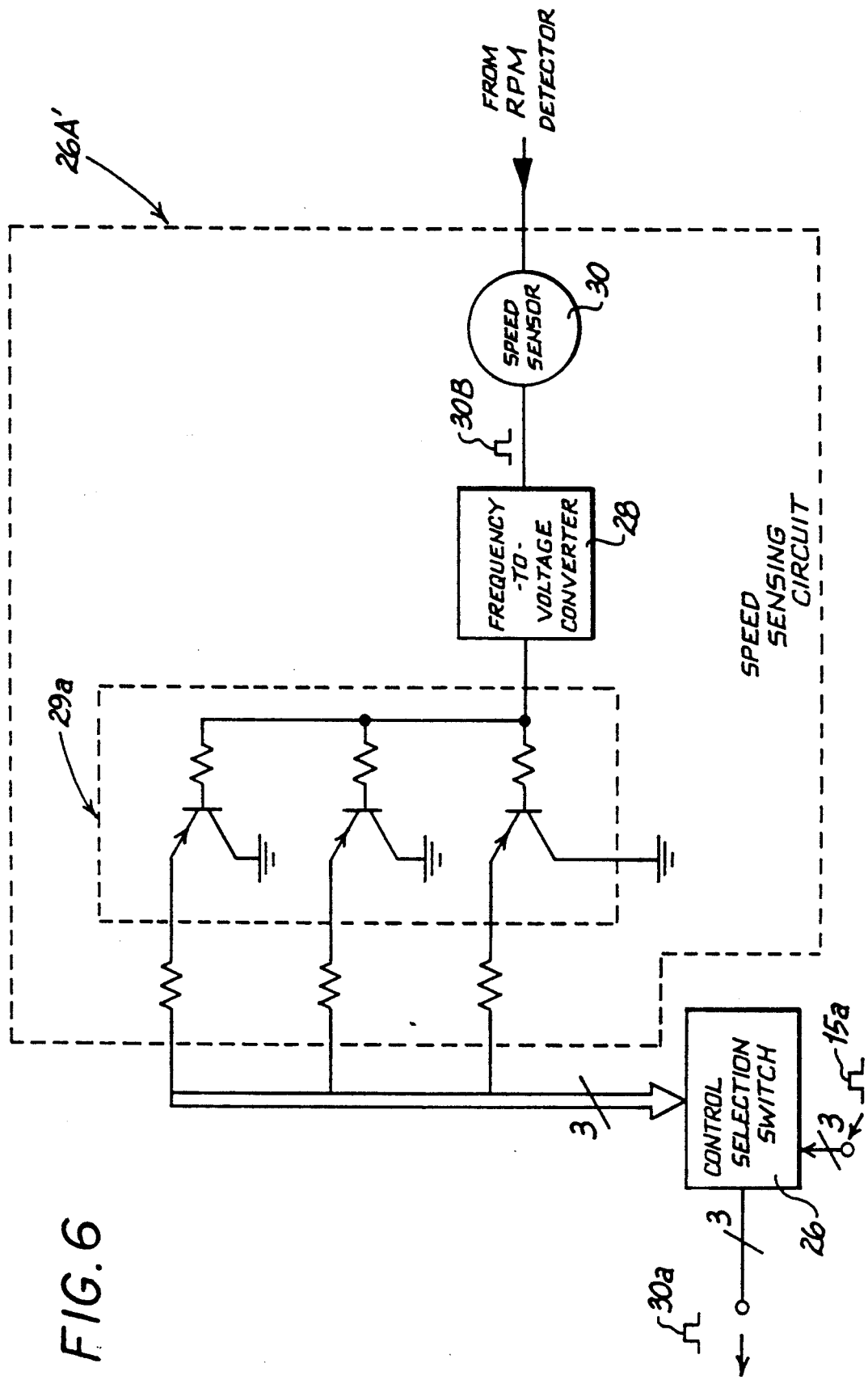
FIG. 6 describes the speed-sensing circuit within the transmitter section of the present invention.

Referring to FIG. 6, the Speed-Sensing Circuit 26A of the present invention will now be described.

The proximity device within the automobile of the above-described example may be used also where the automobile is traveling at a high rate of speed. In such a case, the distance between the automobile and the proximity device and the automobile directly behind that auto may be determined regardless of the rate of speed of each. Further, a phase or frequency shift may be detected within the received signal as a result of differences in the rate of speed between the two automobiles.

Speed sensor output signals 30B are used to extend the envelope (concomitantly the number of cycles contained therein) of the transmitted-carrier frequency signal 3 depending on the speed. The gating window of the transmitted energy signal (transmit-key signal 19) is increased or decreased accordingly.

Operationally, a frequency-to-voltage converter 28 is coupled to a speed sensor 30, which may receive impulses from sensors mounted at an axle or drive shaft. A signal is thereby generated having a frequency proportional to a speed of a vehicle upon which the proximity device is mounted. Speed-sensor output signal $30b$ is then converted to a voltage by the frequency-to-voltage convertor.

This voltage is then applied to transistors $29a$ to provide speed-sensor output signals $30a$ which modify the timing of the blanking delay signal 22', the gating signal 24 and the transmit-key signal 19 by loading their respective RC-delay section. The added signal length is required for accuracy of signal processing resultant from the high energy of the output signal pulse 13'. Although the present embodiment depicts each of the blanking delay signal 22', the gating signal 24 and the transmit-key signal 19 being modified, alternative embodiments need only modify the blanking delay signal 22' to set a range of detection. It is also understood that other controllable devices may be employed to accomplish the loading such as opto-coupling devices.

Figure 7:
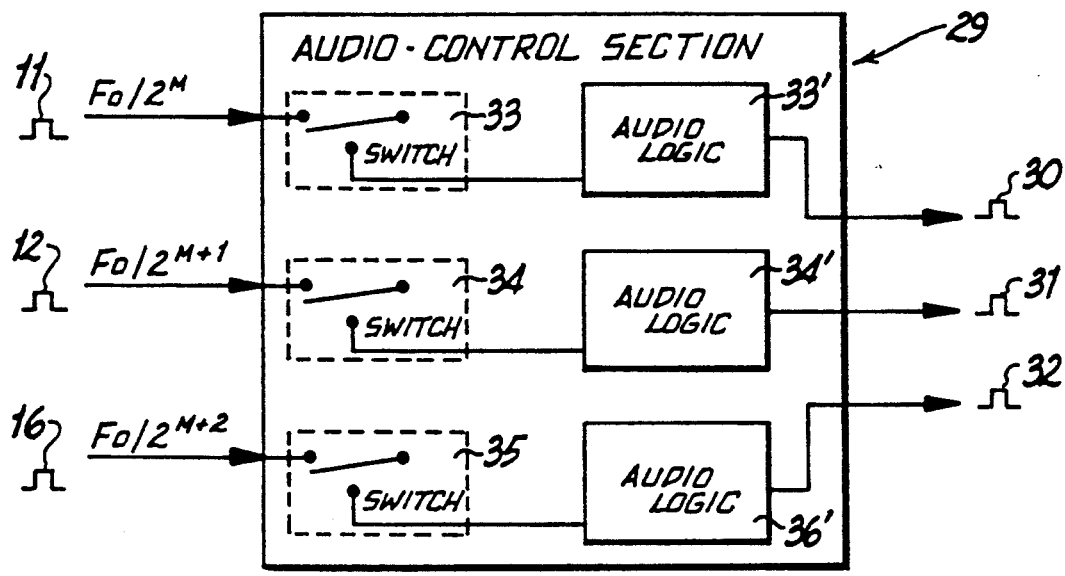
FIG. 7 describes the audio-control section within the transmitter section of the present invention.

Audio-control section 29 now will be described with reference to FIG. 7.

A plurality of signals that control a plurality of audio sensors, left-audio input 11, mid-audio input 12 and right-audio input 16 are coupled into audio control section 29. Therein, switching control logic controls the output of left-audio output 30, mid-audio output 31 and right-audio output 32, which control the audio detectors of the present invention. The three audio output signals (left, middle and right) are controlled by three switches 33, 34 and 35, respectively.

Figure 8:
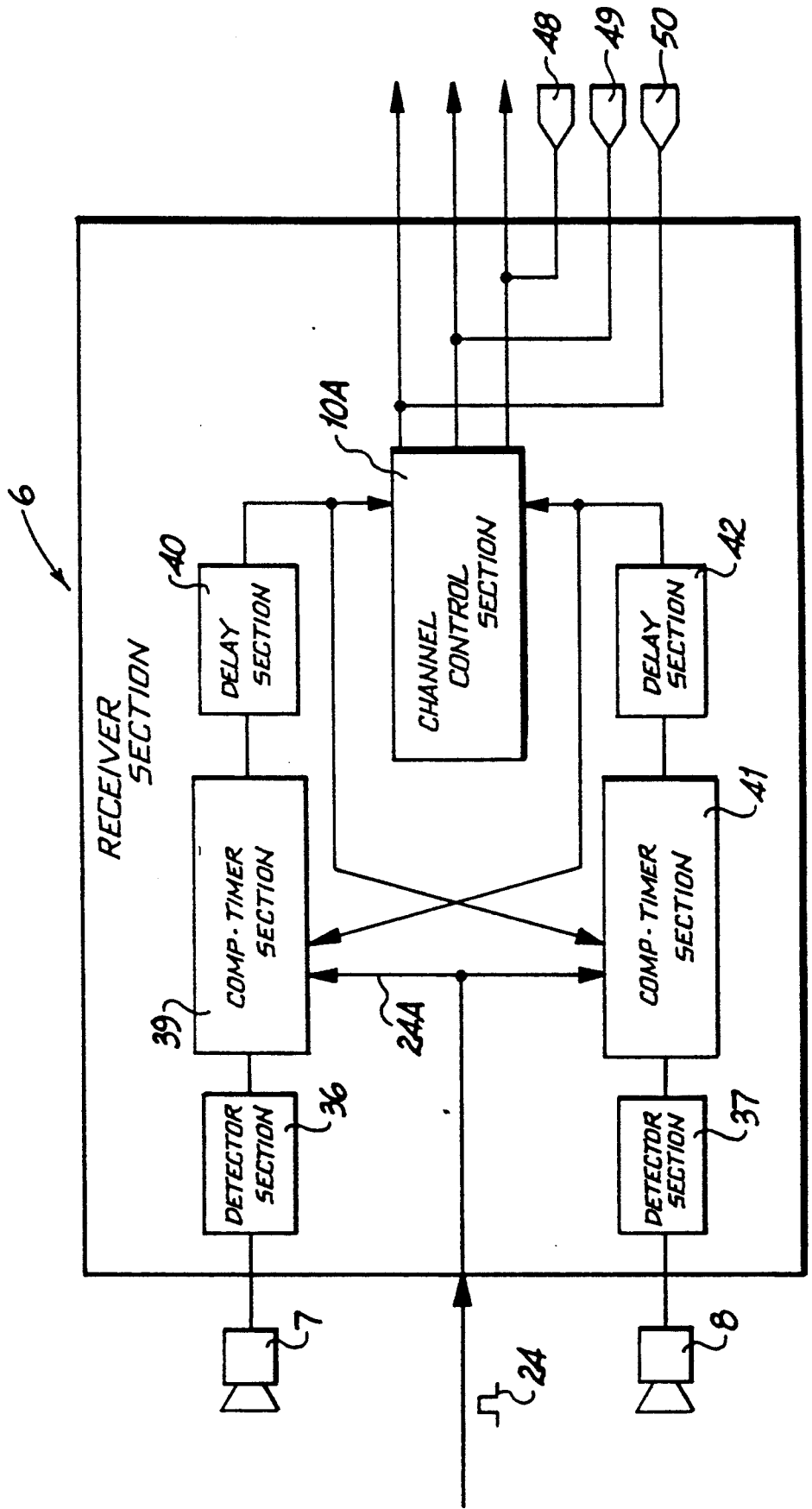
FIG. 8 is a system-level depiction of the receiver section of the present invention.

With reference to FIG. 8, receiver section 6 and its operation on a system level now will be described.

Figure 18:
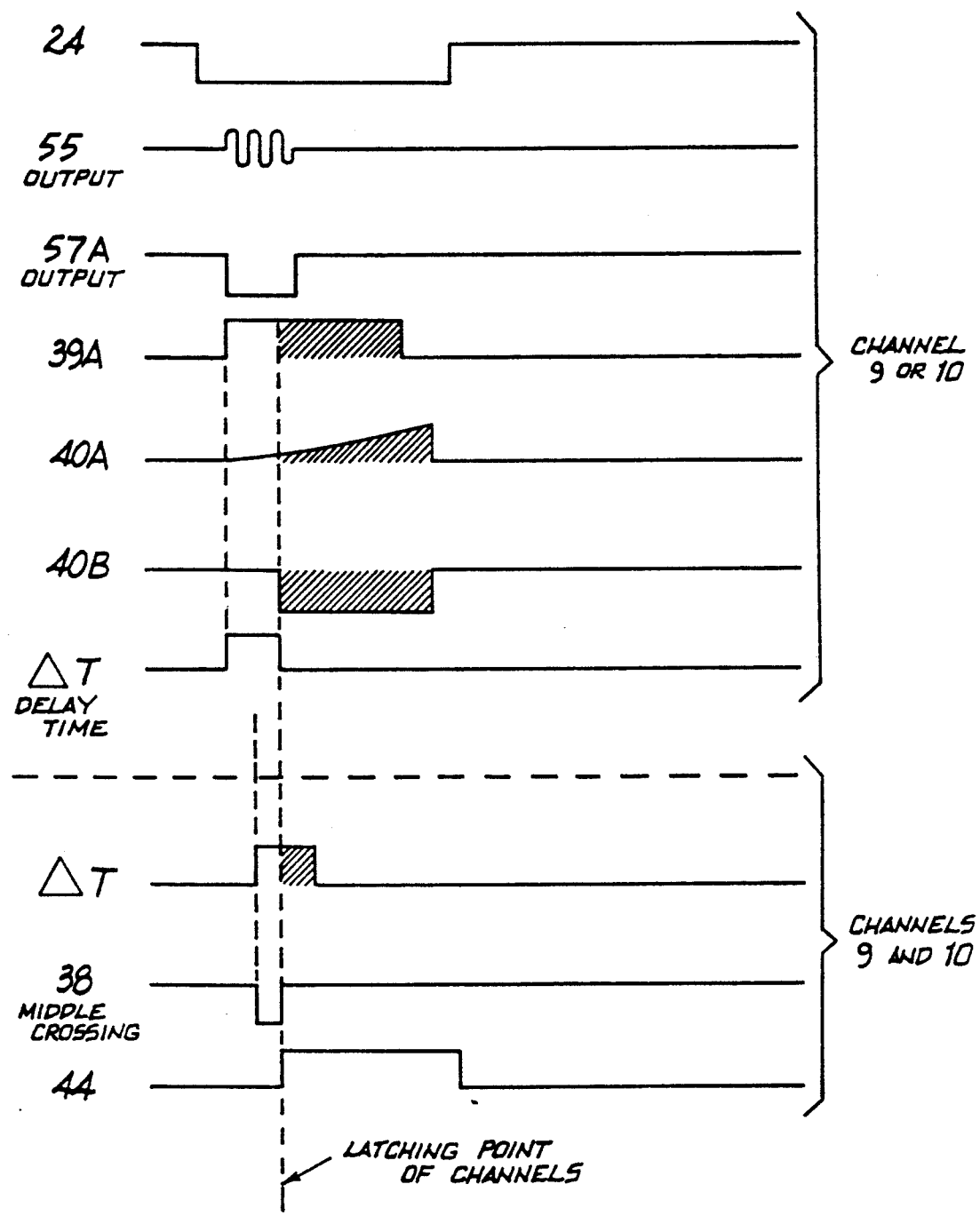
FIG. 18 shows the timing signals required within the receiver section of the present invention.

The receiver section 6 consists essentially of a plurality of channel control and timing means. (See also timing signals depicted in FIG. 18). The control and timing means determine which channel received a reflected signal energy first, the distance to an object or nearest surface of an object to the device falling within a predetermined angular scanning range and reflecting the signal energy and the angular relation to it.

The present embodiment consists of two channels, a left channel 9 and a right channel 10.

Reflected signal energy entering the left and right channels, 9 and 10, is processed only if enabled by gating signal 24, formed within cascade-timer section 17 of the transmitter section 2. It should be noted that a receiver such as receiver section 6 is able to operate independently of transmitter section 2 if a gating signal 24 is provided by another source. When enabled, each channel measures the time from transmission of the output signal pulse 13' to a detection of the reflected signal. With this time information, the distance the signal traveled is determined as well as the angular or radial displacement of the reflected signal energy.

Figure 17:
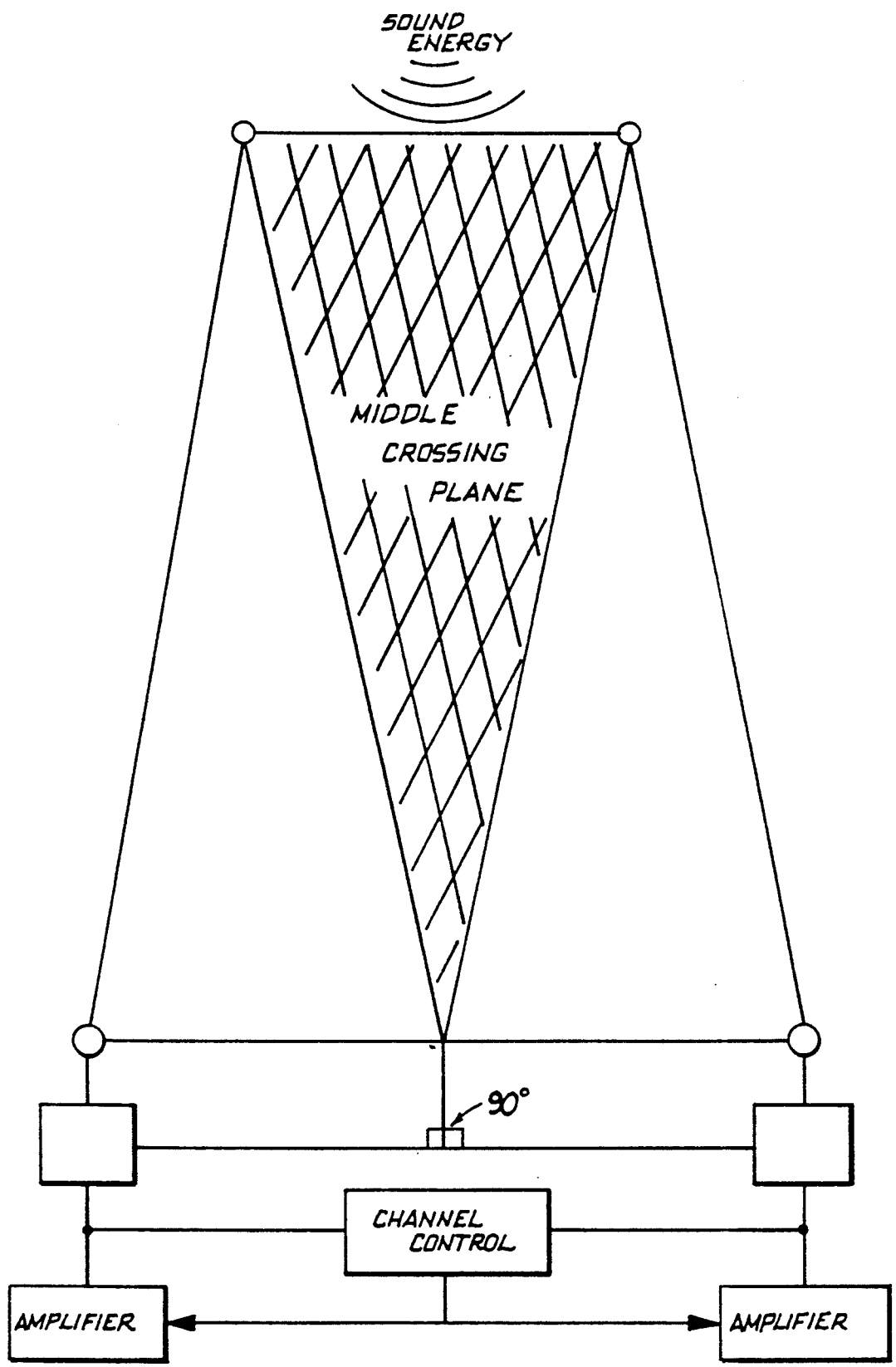
FIG. 17 shows the middle crossing section between two sources of energy.

Another embodiment of the present invention whereby the direction of energy transmitted from a distance can be determined (distance and direction) will be described now with reference to FIG. 17.

By grounding gating signal 24 which is output from the cascade-timer section 17 of the transmitter section 2, the receiver section 6 is constantly enabled. Therefore, incoming energy signals detected by the receiver section 6 may be, but will not necessarily be recognized, only if they fall within the middle crossing plane, defined by the hatched area in the figure. An example of such a device would be a directional microphone wherein the angle of the incoming received sonic signal could be narrow or broad.

Control logic within the receiver section 6 causes the channel receiving the signal energy first to blank the operation of the other channel. This mode of operation prevents the second channel from producing signals acknowledging the receipt of reflected energy. The system responds accordingly.

However, the difference in time of received energy between the channels results in one channel being disabled only if the time difference is more than negligible. A time difference, in excess of "negligible", corresponds to a noticeable or measurable angular or radial displacement of the object or nearest surface of the object from a direction normal to the mid-point of the line formed between the two channels 9 and 10.

Operationally, if the time difference between receipt of signals received at the left and right channels, 9 and 10, is negligible, both channels are blanked or disabled (to be discussed in greater detail below). Concurrently, control logic within the receiver section 6 informs the user via a plurality of audio transducers, 47, 48 and 49 (not shown) and/or the system.

Figure 9:
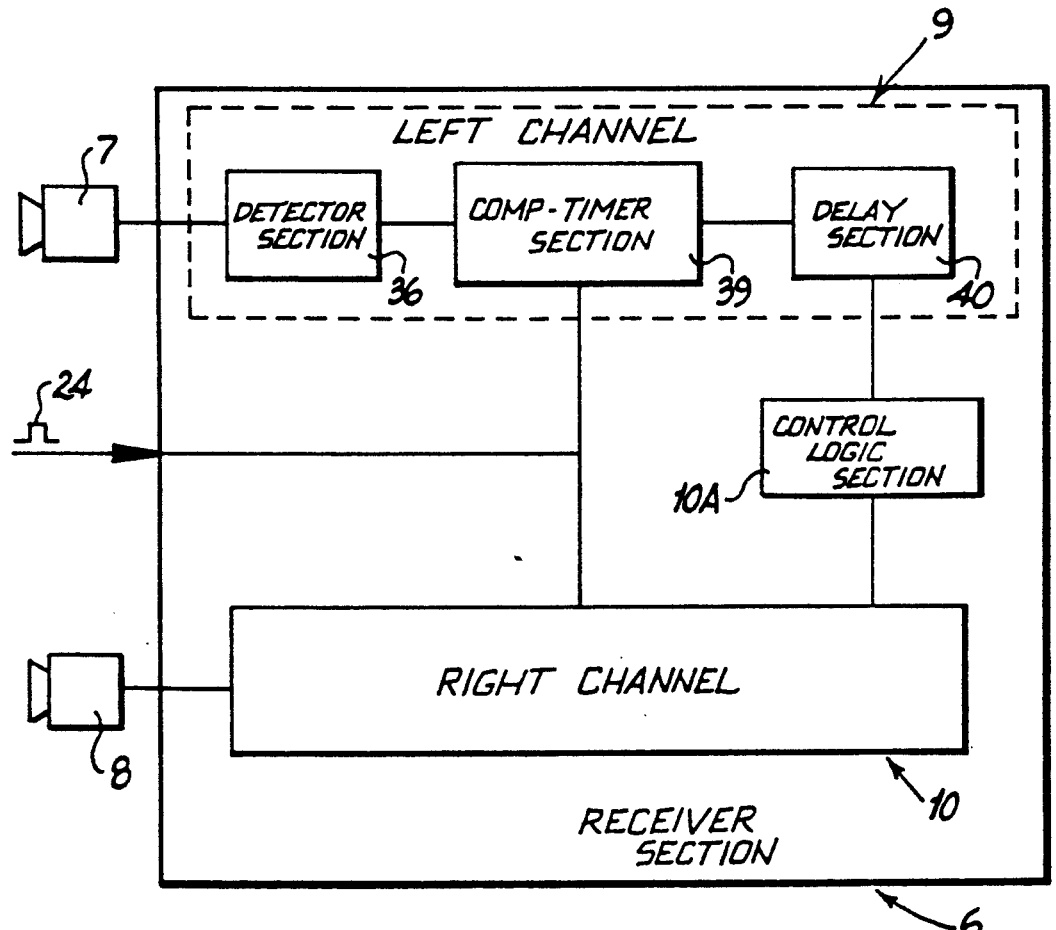
FIG. 9 depicts the dual channel nature of the receiver section of the present invention.

With reference to FIG. 9, operation of receiver section 6 now will be described focusing on the left channel 9 only, whereby tedious duplication of the operation of the right channel 10, the mirror image of left channel 9, is avoided.

As mentioned above, receiver section 6 consists essentially of a left channel 9 and a right channel 10. Each channel is coupled to a sonic sensor, 7 or 8, corresponding to the left and right channels, 9 and 10, respectively. The sonic sensors receive reflected sonic signal energy and transform it into an electrical signal, reflection signal 7A, for processing within each channel.

Figure 10:
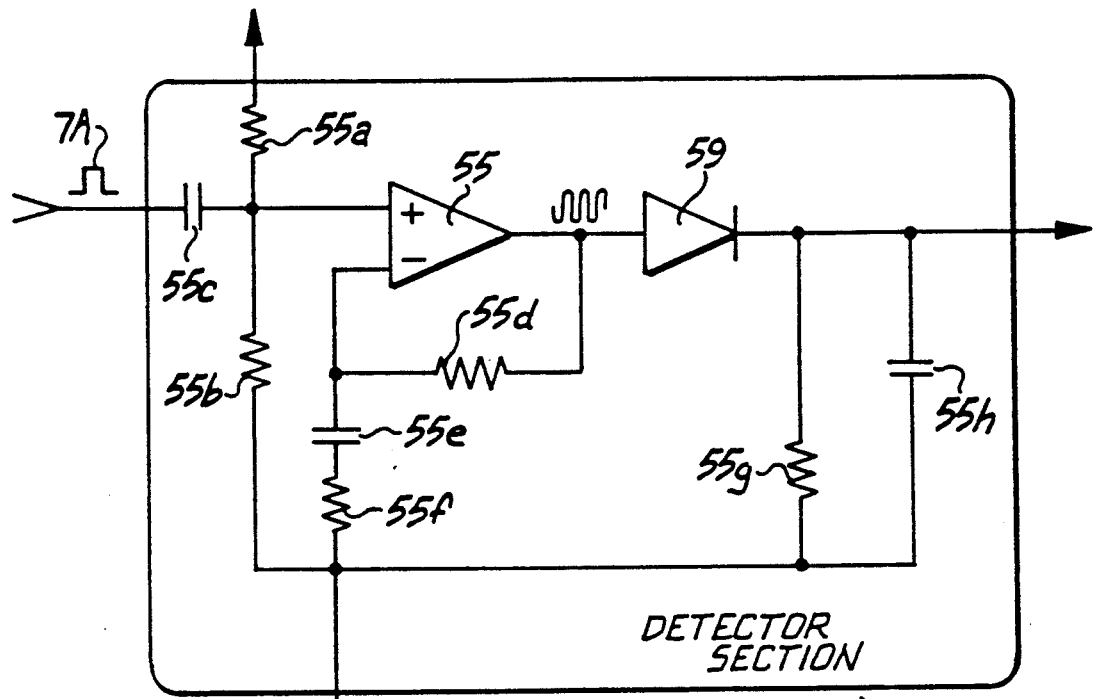
FIG. 10 depicts the detector section within the receiver section of the present invention.

Reflection signal 7A output is amplified within a detector section 36 (to be described in greater detail in FIG. 10). The output from detector section 36 is coupled to comp-timer section 39. Comp-timer section 39 determines which detected signal will be processed. Output from comp-timer section 39 is coupled directly into a delay section 40. However, a comparator 57A within comp-timer section 39 (to be discussed i greater detail below) produces an output only if enabled by gating signal 24. Finally, the logic of channel control section 10A determines the signals to be output, such as the audio control signals. Control section 10A is particular to neither the left 9 nor right 10 channels.

Detector section 36 now will be explained with reference to FIG. 10.

The reflection signal 7A output from sonic sensor 7 is capacitively coupled to an amplifier 55. Amplifier 55 detects the envelope of the reflected electrical signal to the level required for processing. It consists of a diode 59 and an R-C section. The output of amplifier 55 is coupled to the input of an comparator 57A within comp-timer section 39.

Figure 11:
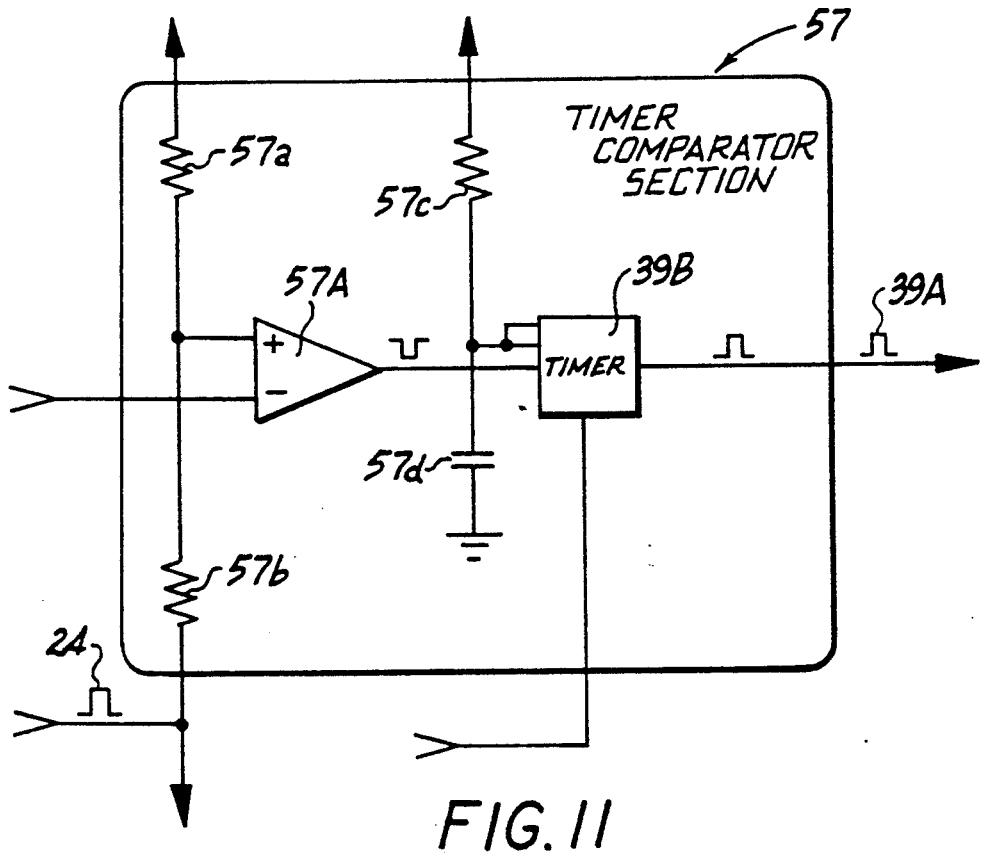
FIG. 11 shows the comparator section within the receiver section of the present invention.

Comp-timer section 39 and now will be explained with reference to FIG. 11.

Comp-timer section 39 receives the envelope of the reflected signal 7A, formed within detection section 36, at comparator 57A. Output from comparator 57A is coupled to timer 39B. Comparator 57A output, however, is enabled only within a time window defined by gating signal 24 in conjunction the output from invertor 63. If the timing is not right, i.e., the period when the transmitter is transmitting a carrier-frequency signal 13 or subsequent ringing, comp-timer section 39 will receive the input but will be unable to process the signal.

Figure 12:
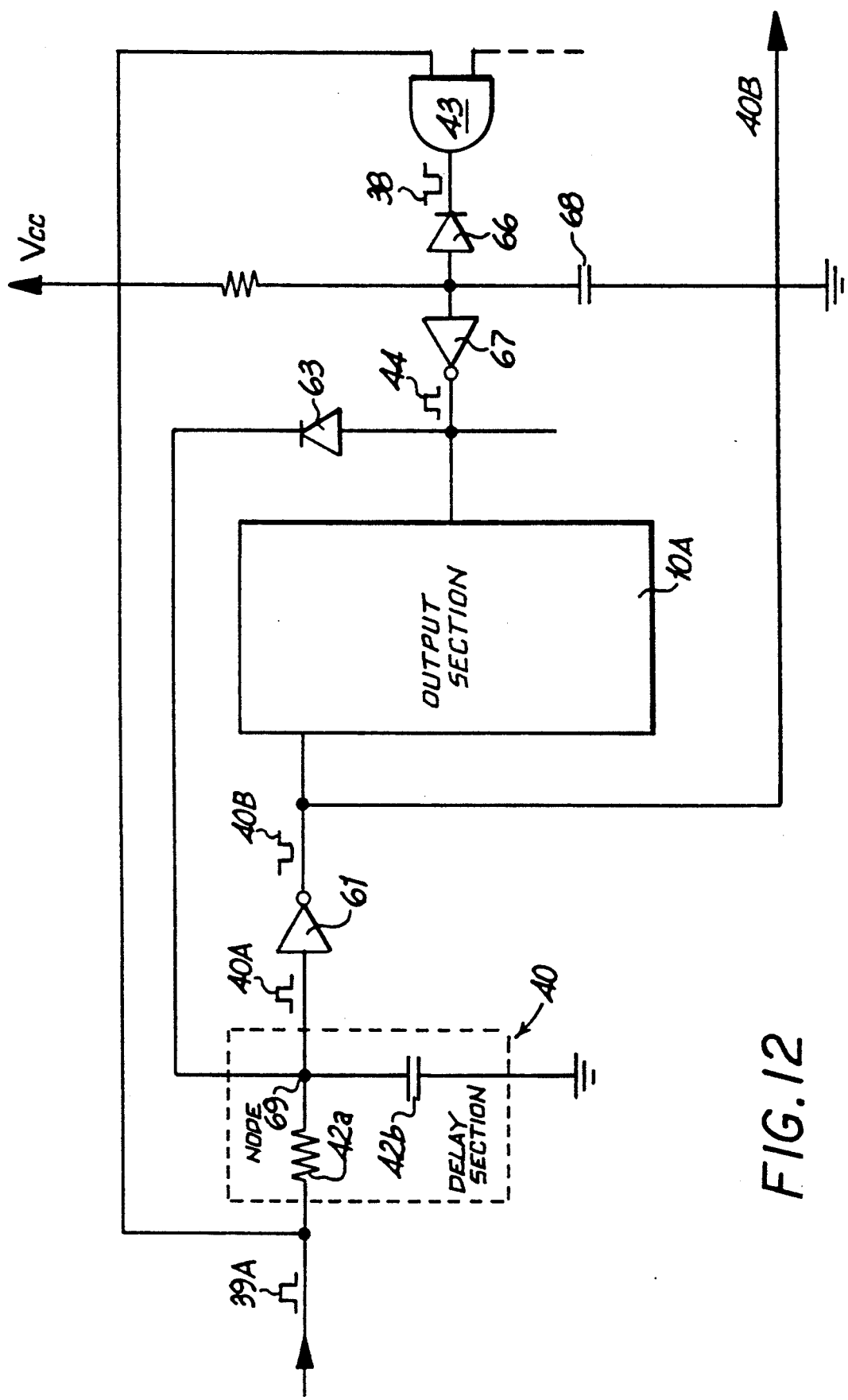
FIG. 12 shows a delay section and control logic section within the receiver section of the present invention.

Comp-timer section 39 outputs a trigger-timer signal 39A. When comp-timer section 39 has not received a reflection signal 7A or when it has been directly disabled by a comp signal 44 (to be discussed in greater detail below), its output exists in a low state. Trigger-timer signal 39A=0 volts. Trigger-timer signal 39A is coupled to both a delay section 40 and a time comparator 43 (AND gate), both of which are depicted in FIG. 12.

The following explanation describes system operation when both channels receive reflected signal energy contemporaneously, i.e., the source of the reflected signal energy is at a normal which is midpoint to the line formed between channels or a signal falls within the middle crossing sectional plane, which is defined as that area falling between rays separated by a predetermined scanning angle. The scanning angle may vary from 0 to 90 degrees relative to a first stationary ray coincident with a normal to a line between two channels formed at the midpoint.

When comp-timer section 39 receives a reflection signal 7A, the output is driven high; trigger-timer signal 39A=Vcc. An R-C time delay within delay section 40 delays trigger-timer signal 39A for a variable but predetermined period. The delayed signal is referred to as trigger-timer delay 40A. The definition of this trigger-timer delay 40A is essential to the operation of the device, since it defines the outside angle from the normal formed midpoint to the line formed between the two energy receivers, energy outside of which will not be processed. The angle can be defined anywhere form 0 to 90 degrees. Invertor 61 inverts trigger-timer delay 40A, providing an inverted-delay signal 40B.

Trigger-timer signal 39A, together with trigger-timer signal 41A which is output from trigger timer 41 of the right channel 10, are coupled to time comparator 43.

Time comparator 43 defines middle-crossing signal 38. Only when both input signals to time comparator 43 are in a high state its output is low; middle-crossing 38=0 volts.

When middle-crossing signal 38 is low, current drains from capacitor 68 (previously charged to Vcc while middle-crossing output is high) through diode 66, causing the output of invertor 67, comp signal 44, to be driven high. Consequently, comp signal 44 exists at a node 69 in the left channel 9 which is the point in the circuit at which trigger-timer delay 40A is output after delay by delay section 40.

Since the right channel 10 is the mirror image of left channel 9, comp signal 44 also exists at node 70, the point in the right channel circuit at which trigger-timer delay 42A is output after delay by delay section 42. Invertors 61 of the left channel 9 and 62 of the right channel 10 drive the reset inputs to trigger timers 39 and 41 low, disabling or resetting both timers triggers 39 and 41 (latching them).

Figure 13:
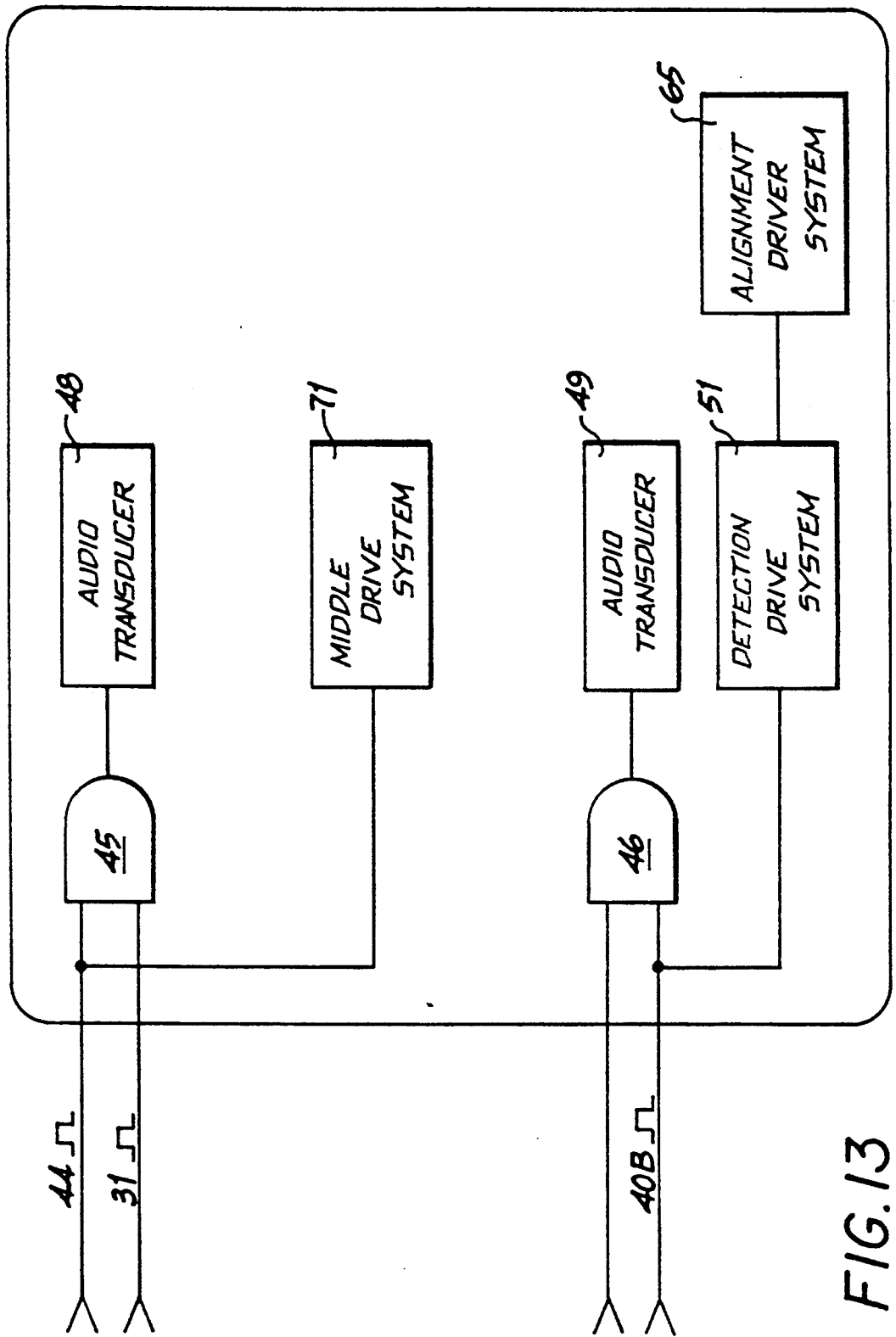
FIG. 13 shows a more detailed view of the control logic section within the receiver section of the present invention.
Figure 13B:
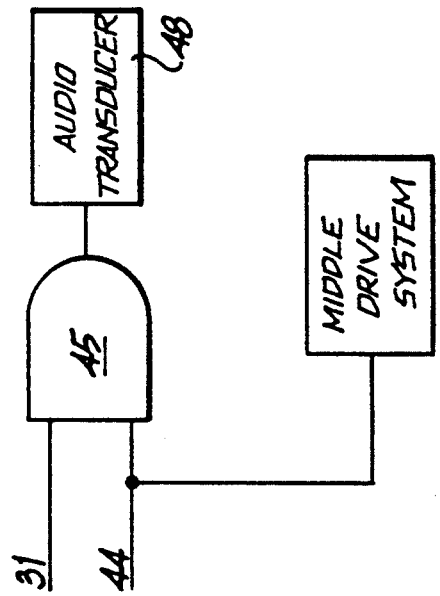
FIG. 13B is a depiction of the middle drive system.
Figure 13A:
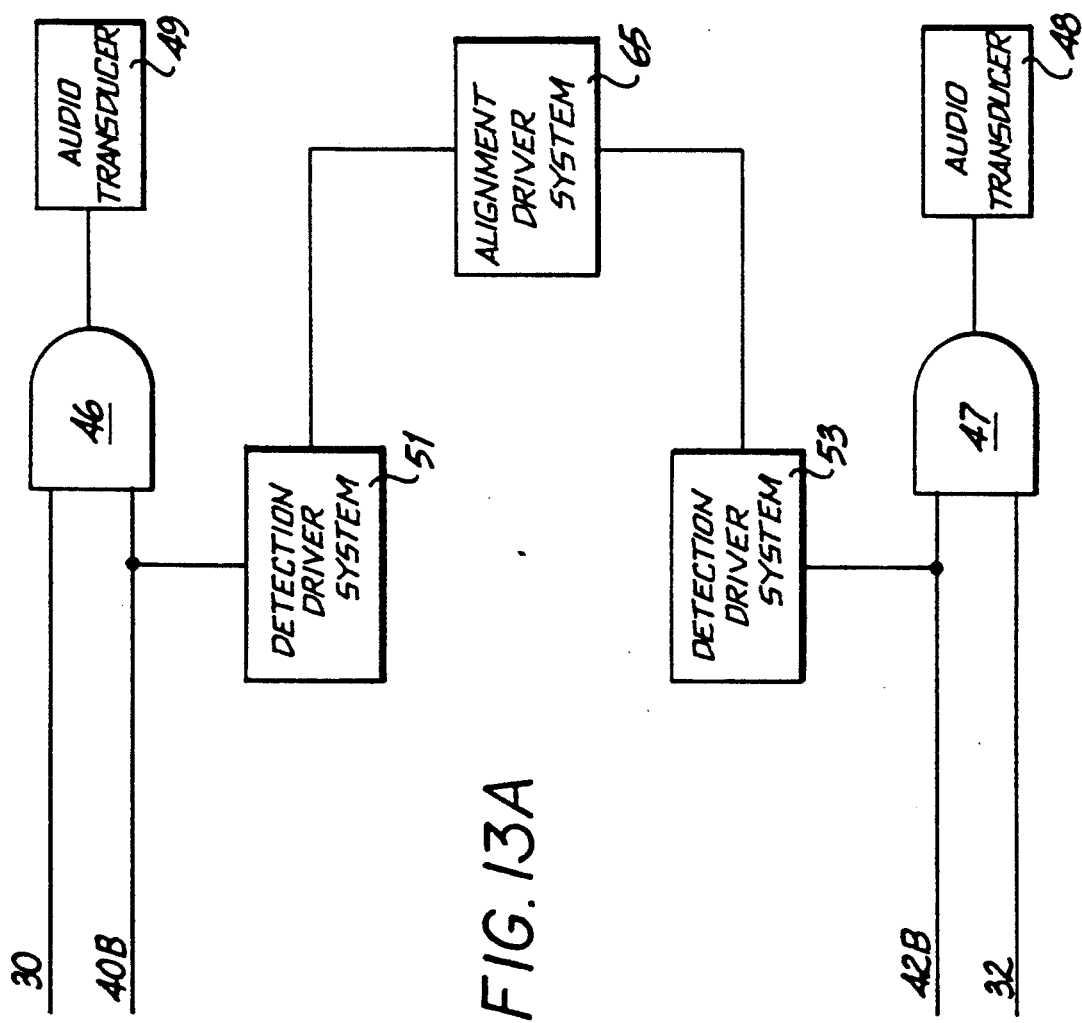
FIG. 13A is a depiction of the left and right detection driver system.

Comp signal 44 is also coupled to a middle detector 45 (see FIG. 13). When driven to a high state, comp signal 44 enables mid-audio output 31 to drive an audio transducer 48 thereby providing an audio signal in the audible range which informs the user that an object or nearest surface of an object surface is at some distance at a normal formed at the midpoint of a line extending between sonic sensors 7 and 8.

The following explanation will describe the case where the reflected signal is not received contemporaneously by both the left and right channels 9 and 10.

A signal received by left channel 9 and enabled by gating signal 24 drives the output from timer trigger 39, trigger-timer signal 39A, high. Trigger-timer signal 39A drives the time comparator 43 output, middle crossing 38 goes high; middle crossing 38=Vcc. A high middle crossing 38 allows capacitor 68 to charge to Vcc whereby the output of invertor 67, comp signal 44, is driven low. Consequently, both the electrical state of node 69 and the output of middle detector 45 (mid-audio output 31) go low. Thereby, the frequency of the signal which is directed to the audio transducer 48 will be changed to reflect the fact that there has been a middle crossing detection.

The low state of node 69 will be driven high only with the arrival of trigger-timer delay 40A. Prior to that time, a low state of node 69 drives the output of invertor 61 high; inverted-delay signal 40B=Vcc. This high signal on the reset input of trigger timer 41 does not induce a change in the state of the output, trigger-timer signal 41A. Therefore, timer trigger 39 (left channel) is enabled and timer-trigger 40 (right channel) is blanked.

A signal received by left channel 9 and enabled by gating signal 24 drives the output from timer trigger 39, trigger-timer signal 39A, high. Trigger-timer signal 39A drives timer delay section 40, producing trigger-timer delay signal 40A. This signal is then inverted by invertor 61 and produces inverted-delay signal 40B. When inverted-delay signal 40B goes low, it resets timer 41 thereby disabling it.

Inverted delay signal 40B also exists at a middle detector 45 enabling the middle transducer. Apparently, signal 40B also exists on the detection drive system, causing the alignment driver to be enabled.

In addition to the performing the function of blanking the channels (timer triggers 39 and 41), inverted-delay signals 40B and 42B are also responsible for enabling audio detection control logic designating the detecting channel and the a detection-drive section 51.

For example, if the signal is detected first in the left channel 9, inverted-delay signal 40B is driven low. A low state of the inverted-delay signal 40B enables left detector 46 to allow left-audio output 30 to drive an audio transducer 49 thereby providing an audio signal in the audible range which informs the user that the left channel is nearest to the source of the reflected energy.

The low state of inverted-delay signal 40B is also coupled to detection-drive section 51. Detection-drive section 51 outputs a detection-drive signal 52 for driving an alignment driver system 65. Alignment driver system 65 may be a relay, motor or other control signal for various applications.

Figure 14:
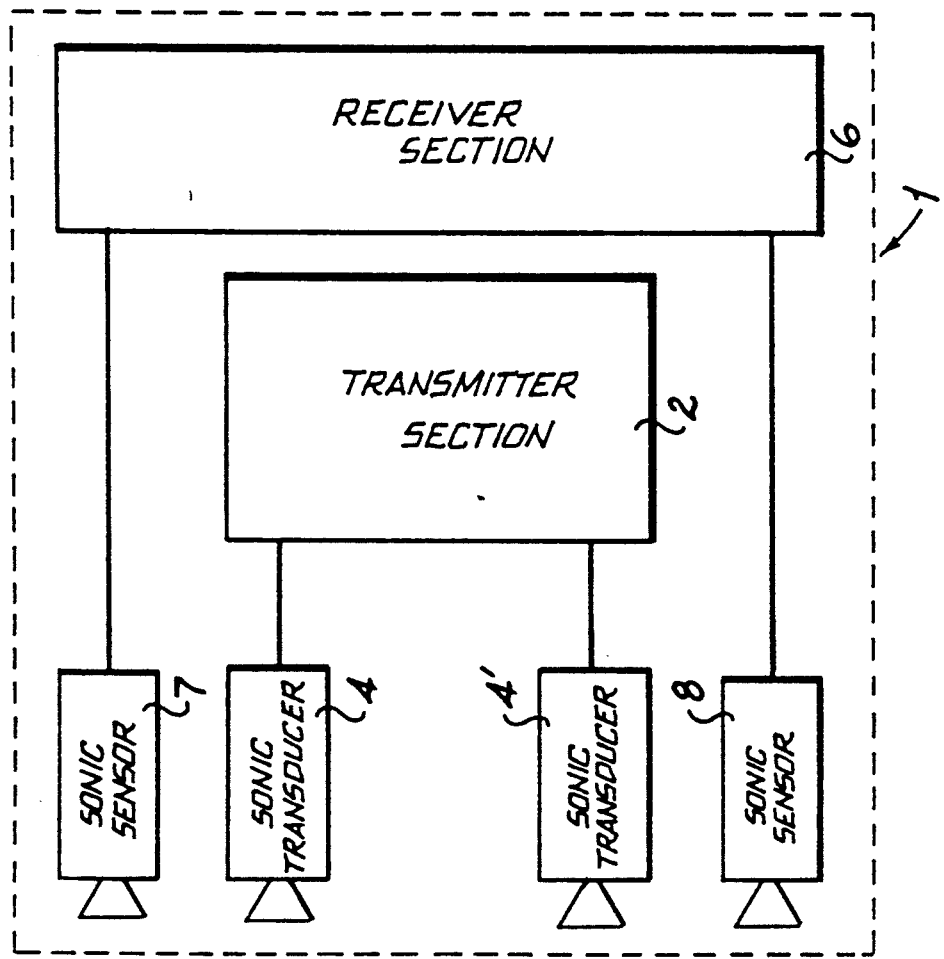
FIG. 14 shows another embodiment of the present invention.

An embodiment of the present invention wherein the transmitter has two sonic transducers is shown in FIG. 14.

Figure 16:
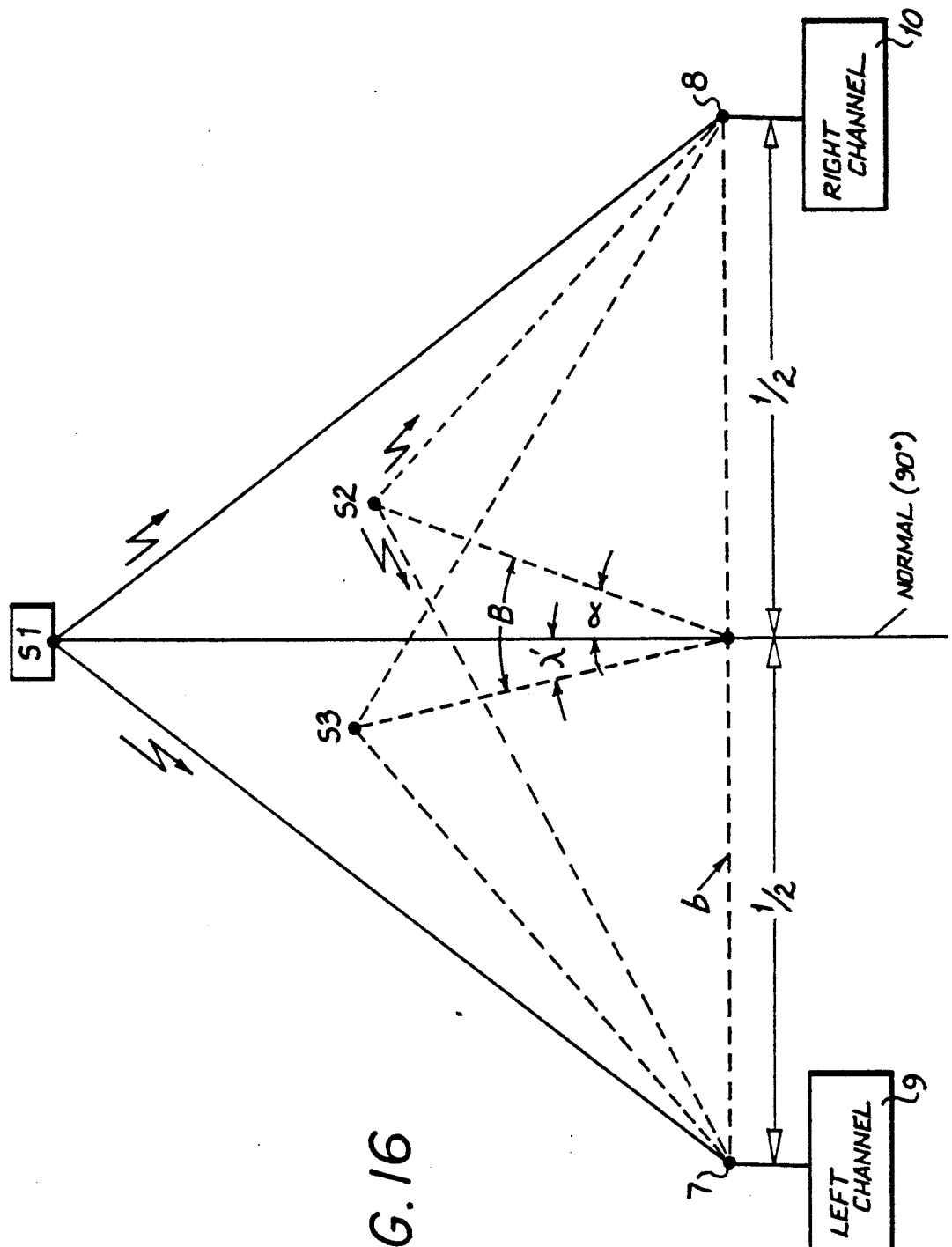
FIG. 16 shows the level of a scanning field of the present invention.

FIG. 16 shows an embodiment of the present invention in which an energy signal received by a receiver is limited to an energy signal radiating from a position falling within the range of a scanning field of the receiver. The receiver scanning field is adjustable.

Figure 15:
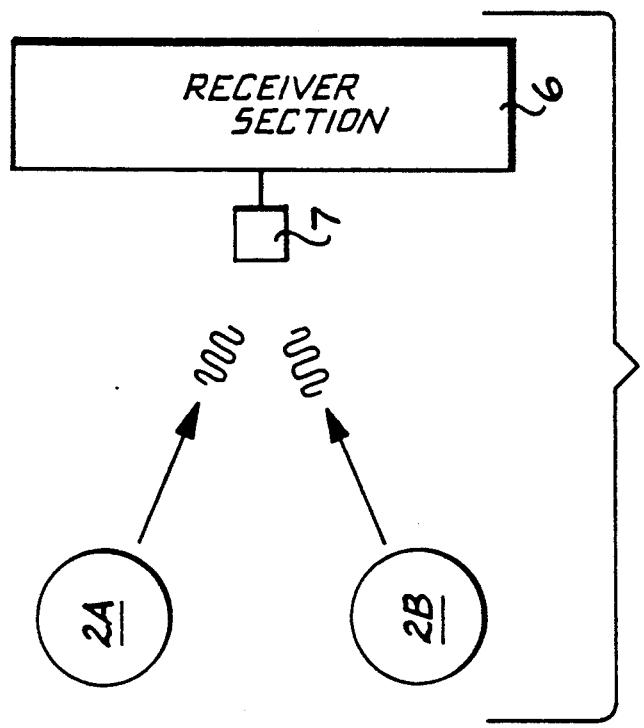
FIG. 15 shows yet another embodiment of the present invention.

An embodiment of the present invention where the two transmitted signal sources remain at fixed points in space transmitting signal energy in order for a receiver section to determine its location proximate to the two transmitters is shown in FIG. 15.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Figure 12A:
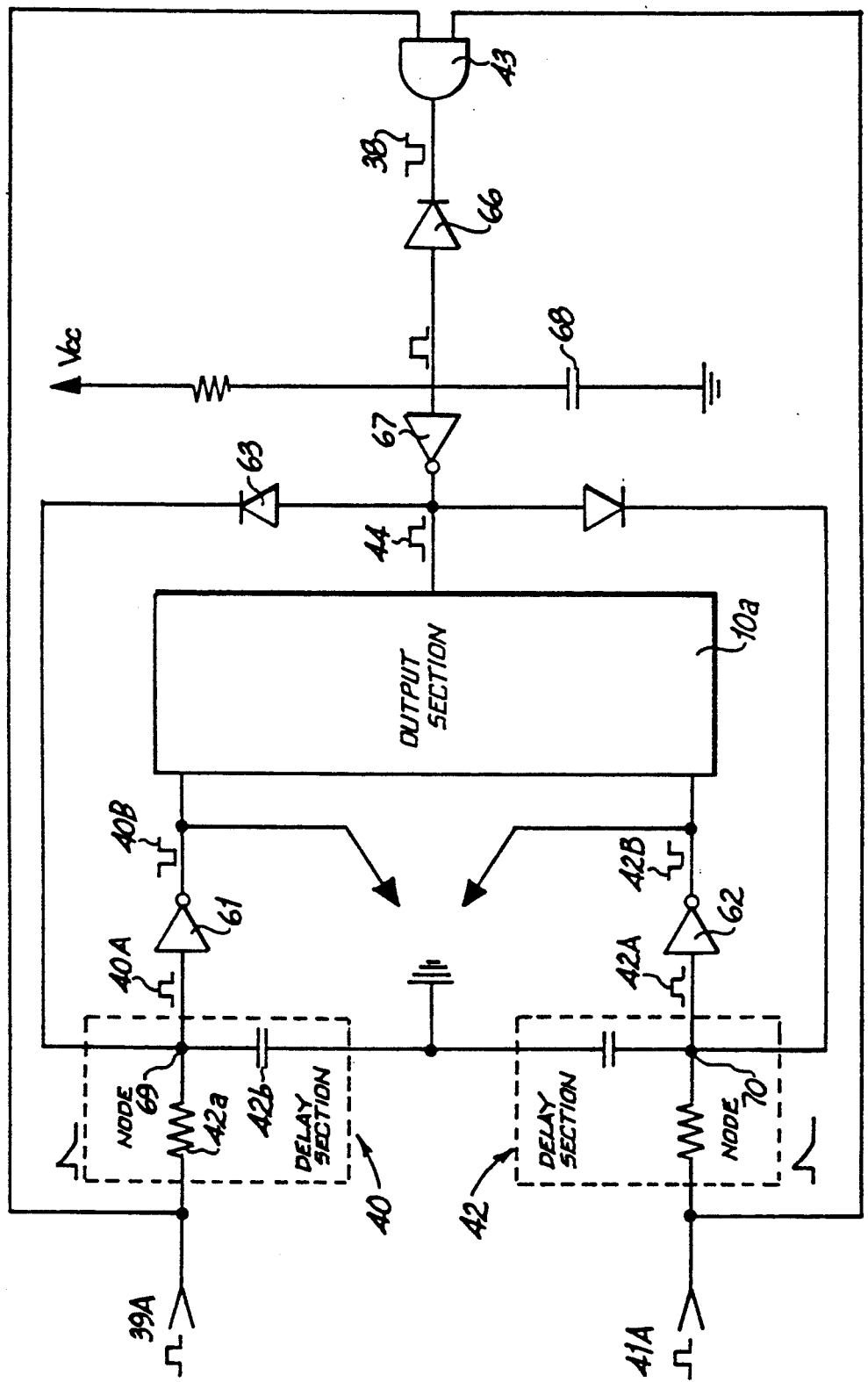
FIG. 12A shows both channels as described in FIG. 12.

FIG. 16 shows energy sources, designated S1, S2, and S3 located at three different positions in the figure. Energy sources S1, S2, S3 may be remote energy transmitters or may be objects reflecting signal energy radiated from an energy transmitting device of the present invention. FIG. 16 also shows a left and right energy sensor 7, 8 electrically connected to a left and right channel 9, 10, respectively, of a proximity device of the present invention. A straight line extends between left and right energy sensors 7, 8. A normal extends from a midpoint bisecting the straight line at a distance b from energy sensor 7. Left and right channels 9, 10 are part of a receiver (FIGS. 9, 12A) of the present invention.

FIG. 16 also shows relative displacement angles $\alpha$ and $\alpha'$, which together form an angle B defining a focal scanning range of the proximity device. The present invention identifies each energy source relative to the focal scanning range in accordance with an electronic based triangulation method. The electronic based triangulation method allows for a determination of an angular displacement to each energy source relative the normal, i.e., any of energy sources S1, S2 and S3.

In one form of the invention, a transmitter is included which operates in conjunction with a receiver. The transmitter transmits an energy signal into space via at least one energy transmitting device. A portion of the transmitted energy signal may be reflected from an object and received at energy sensors 7, 8. Because the speed of propagation of the energy signal is known, a distance traversed by the signal can be determined by the device. A time lapse between transmission of the energy signal and the receipt of a reflected portion of the energy signal at each of energy sensors 7 and 8 is proportional to the distances to each energy sensor from the energy source. By knowing the distance from an energy source to each energy sensor 7, 8, and knowing of the distance between the energy sensors, i.e., 2b, the exact distance from the midpoint and the exact angular displacement from the normal can be determined.

Operation of an embodiment of the present invention having only a receiver, i.e., operation without a transmitter, is as follows.

A remote transmitter, such as energy sources S1, S2 and S3, may radiate an energy signal towards the proximity device as a tracking signal. Upon receipt of a portion of an energy signal at either left channel 9 or right channel 10, a timer within a timer section associated with each channel begins a count. A timing signal is generated in the timer section and input to a time delay section electrically connected to the timer section. The time delay section generates a time delay for each channel. For example, if right channel 10 receives the energy signal before left channel 8, a time delay signal is generated proportional to an angle $\alpha$. If left channel 9 receives the energy signal first, the time delay signal generated in response is proportional to an angle $\alpha'$. Angles $\alpha$ and $\alpha'$ must be less than or equal to the outer rays formed of an angle B, the angle which defines the focal scanning range of the device.

The energy source is determined to be outside the focal scanning range of the device if the time delay generated within the first channel to receive the energy signal, e.g., left channel 9, runs before the second channel to receive the energy signal, e.g., right channel 10, receives the energy signal. In that case, left channel 9 disables right channel 10 thereby controlling the operation of the right channel 10 and the proximity device. Concurrently, an alignment signal is generated indicating that the energy source lies to the left of the proximity device in relation to the normal.

An alignment system may, in conjunction with the generated alignment signal, rotate the device in an angular increment towards the energy source in response to a received energy signal. The alignment system could continuously rotate the proximity device in angular increments towards the energy source, i.e., one of S1, S2 and S3, until the device is positioned such that an energy source is within the device's focal scanning range. The proximity device realizes that the energy source is within its focal scanning range when the second channel to receive the energy signal, or right channel 10, receives the energy signal before the time delay associated with the left channel 9, runs. The alignment drive system is shown in FIG. 13.

Once the proximity device determines that an energy source is within the device's focal scanning range, i.e., that both channels have received the energy signal before a time delay has run, a time comparator within each timer section compares the timed receipt of the energy signal at each channel. A time difference signal is generated by the comparison. The time difference signal is used as a time base for determining the angular displacement to the energy source. The present operation occurs only after it is determined that the energy source is within the focal scanning range. The angular displacement is defined relative to the normal.

The time difference signal is provided to a time delay limiter section. The time delay limiter section generates a time delay limiter signal. The time delay limiter signal is provided to both time delay sections to change the value of the time delay signals generated there. The focal scanning range of the device is thereby changed. Concomitantly, the timer sections are reset preparing the channels to receive a new energy signal. A continuous iterative process in this manner enables the device to narrow the time delay and therefore the focal scanning range. The narrowing better defines the particular angular displacement from the device to the energy source relative to the normal.

A proximity device having both a receiver and transmitter may determine exact angular displacement and exact distance to an energy source according to the following. When a transmitter within the proximity device transmits an energy signal into space to "search" for a particular object, a time reference signal is generated concurrently at transmission and transferred to each timer section within the receiver. Contemporaneously within the channel controller, a first oscillator generates a first oscillator signal for use by each timer section. A counter within each timer section counts the number of cycles of the first oscillator signal. The number of cycles counted corresponds to the time lapse between transmission and receipt of the same energy signal by the energy sensors.

This time lapse is used in determining the difference in the distances between an energy source, such as one of energy sources S1, S2, and S3 and each of energy sensors 7, 8. The energy source could be a remote energy transmitter or an object reflecting signal energy radiated towards it. If the energy source is not at approximately 0° relative to the normal, the proximity device will detect a time difference proportional to the difference in distances to each energy sensor, and generate a time difference signal.

The time difference signal is used within the proximity device as a time base for counting the cycles of a second oscillator signal generated by a second oscillator within the channel controller. The number of cycles of the second oscillator signal are counted for the duration of the time difference signal. The second oscillator has a variable frequency which is varied in accordance with varying distances between the energy source and energy sensor receiving the energy signal first in time. In other words, the frequency of the second oscillator may be changed internally within the device in accordance with the distance. The number of counted cycles of the signal generated within the second oscillator corresponds to the angular displacement to the energy source.

As is clear from the above description, the focal scanning range of a proximity device of the present invention has a double function. The first function of the focal scanning range is to recognize an energy signal transmitted from an energy source which lies only within the focal scanning range. The second function of the focal scanning range is to recognize an energy source lying outside of the focal scanning range in order to employ a navigation system to track and follow the energy source.

The electronic based triangulation method used by the proximity device of the present invention may be described mathematically by the following explanation.

A first triangle, $\Delta$S2-7-8, may be defined by legs equal to the distances from energy source S2 to energy sensor 7 (leg S2-7), from energy sensor 7 to energy sensor 8 (leg 7-8 equal to 2b) and from energy sensor 8 to energy source S2 (leg 8-S2). The distances defining legs S2-7 and 8-S2 of $\Delta$S2-7-8 are proportional to the times for energy to travel between the energy source S2 to energy sensors 7 and 8, respectively.

A second similar triangle, ΔS2-7-mid, may be defined within triangle S2-7-8. A first leg of ΔS2-7-mid extends from energy source S2 to energy sensor 7 (leg S2-7). A second leg extends from energy sensor 7 to the midpoint between the energy sensors (leg 7-mid, equal to b) and the third leg equals the distance from the midpoint back to energy source S2 (leg mid-S2). The third leg of ΔS2-7-mid, leg mid-S2, may be calculated mathematically by the following:

$$\text{mid-S2} = (2((\text{S2-7})^2 + (\text{S2-8})^2) - (2b)^2)^{1/2}/2$$

Knowing mid-S2, S2-7 and b allows for a determination of the angle formed between leg 7-mid and mid-S2, angle γ. Angle ∝ is equivalent to angle γ minus 90°. Angle γ equals:

$$\gamma = \cos^{-1}((\text{mid-S2})^2 + b^2 - (\text{S2-7})^2)/2b(\text{mid-S2}))$$

Angle ∝, i.e., angle S2-mid-7, therefore equals angle γ−90°.

As long as an energy signal is received by the device from a source of signal energy within the focal scanning range, that is, ∝ < the portion of angle B extending angularly in a positive direction from the normal, or ∝' < the portion of angle B extending angularly in a negative direction from the normal, the device operates to process the received energy signal. If the energy signal emanates from energy source outside of B, the device must be rotated to move the device such that the energy source is within its focal scanning range.

The above description of receiver section operation was explained with reference to energy sensor S2. Similarly, distance to and angular displacement from energy sensors S1 or S3 can be determined.

What is claimed is:

1. A proximity device for determining a distance to and angular displacement from an object or nearest surface of an object, comprising:
   (A) a first energy transmitting device for radiating an energy signal;
   (B) a transmitter section coupled to the first energy transmitting device responsive to a first and second speed sensor signal, the transmitter section including:
   a frequency-scaler section coupled to said energy transmitting device, the frequency-scaler section including a signal energy source for outputting an energy signal thereto;
   means for controlling system timing coupled to said frequency-scaler section wherein a plurality of timing control signals are defined;
   a sequence generator electrically coupled to the frequency-scaler section wherein a plurality of control signals are formed for use in accordance with a variety of distances of operation between the object or nearest surface of the object and said proximity device;
   an audio control section electrically coupled to the frequency-scaler section;
   a control selection switch coupled at a first input to the sequence generator and at a first output to means for controlling system timing;
   means for sensing a relative change in speed between the object or nearest surface of the object and said proximity device and generating a first speed sensor signal therefrom, said speed sensing means electrically coupled at an output to the control selection switch;
   means for sensing a change in speed of the proximity device and generating a second speed sensor signal therefrom; and
   a transmitter-driver section electrically coupled at a first input to the frequency-scaler section, and at a second input to the cascade timer section including means for outputting said energy signal wherein said cascade-timer section defines the duration of said energy signal output in accordance with said plurality of control signals formed within said sequence generator;
   (C) a plurality of energy sensors for detecting said energy signal reflected from the object or nearest surface of the object;
   (D) a receiver section, the receiver section comprising a first and second channel for receiving the reflected energy signal detected by the energy sensors; and
   (E) a channel control section electrically coupled to the first and second channels to determine the distance to an angular displacement from the object or nearest surface of the object.

2. A proximity device according to claim 1, which further includes at least a second energy transmitting device coupled to the transmitter section.

3. A proximity device as defined by claim 1, wherein the energy source of the transmitter section includes a crystal oscillator having a predetermined frequency.

4. A proximity device according to claim 1 wherein the transmitter section generates a gating control signal and wherein said receiver section further comprises:
   a port for receiving the gating control signal from said transmitter section;
   each of the first and second channels containing a detector section, a comparison and timer section coupled to the detector section, and a delay section coupled to the comparison and timer section, wherein each of said first and second channels receives and processes the reflected energy signal detected by one of said energy sensors and that channel which receives the energy signal first controls operation of the other channel;
   means to control said first and second channels whereby a relative distance to and an angular displacement from the object or nearest surface of the object is determined;
   means to output at least a signal for communicating said relative distance and said angular displacement; and
   means for outputting a signal for directing an alignment system to track the object or nearest surface of the object or a remote energy source.

5. A proximity device as defined by claim 4, wherein the delay sections of the receiver section delay processing the received energy signal for a predetermined period time delay.

6. A proximity device as defined by claim 5, wherein the control section of the receiver section processes said received energy signal only when it is determined that said first and second channels have not received the reflected energy signal contemporaneously within said predetermined time delay.

7. A proximity device according to claim 1 wherein said energy source includes a sonic transducer and said energy sensors includes sonic receivers.

8. A proximity device as defined by claim 4, wherein the control section of the receiver section processes the reflected energy signal only when it is determined that said first and second channels have received said reflected energy signal contemporaneously within said predetermined time delay.

9. A method for determining a relative angular displacement from a signal energy source which utilizes the propagation speed of the signal energy, comprising the steps of:
receiving signal energy radiated from the energy source at any of a plurality of energy sensors;
providing the received signal energy to each of a plurality of channels electrically connected to at least one of the energy sensors;
detecting the receipt of signal energy within each channel and generating at least one detection signal therefrom;
comparing the magnitude of each detection signal with a predetermined value and generating a level signal therefrom, the level signal indicating that the received signal energy is recognized for processing;
generating a timing signal for each channel in accordance with each level signal;
delaying each timing signal and generating a time delay signal therefrom, the time delay signal defining a focal scanning range of operation in terms of an angular displacement from the energy source relative to a normal extending from a midpoint of a straight line connecting the energy sensors;
comparing timing signals generated within each channel and generating a time difference signal therefrom, the time difference signal used to determine the angular displacement from the energy source if the source is within the focal scanning range of the proximity device;
comparing the timing and time delay signals and generating an alignment signal therefrom if the comparison determines that a first channel has received signal energy and a second channel not first receiving signal energy does not receive signal energy before the time delay associated with the first channel runs;
delegating control of the second channel to the first channel in accordance with the alignment signal;
generating a time delay limiter signal if the second channel receives signal energy before the time delay associated with the first channel runs;
transferring the time delay limiter signal to each time delay section to redefine the time delays;
generating at least one displacement signal for communicating the relative angular displacement in accordance with the comparing;
generating a positional signal based on the position of the signal energy source relative to the device; and
outputting the alignment, positional and displacement signals.

10. A method defined by claim 9, further including the steps of:
generating an energy signal within a transmitter;
transmitting the energy signal into space from at least one energy transmitting device;
generating a gating signal, the gating signal used to identify a start time of the transmitted energy signal, a blanking time period to blank the receiver during a time period in which the energy signal is transmitted and a time window within which the receiver is responsive;
receiving a portion of the radiated energy signal at each channel section that was reflected from an object in space;
generating a first oscillator signal for determining the distance between the object and any of the energy sensors;
counting the number of cycles of the first oscillator signal corresponding to a time lapse between the energy signal transmission and the receipt of signal energy by each channel and generating a distance signal therefrom; and
generating a second oscillator signal at a variable frequency and counting the number of cycles of the second oscillator signal corresponding to the duration of the time difference signal to determine a distance to the object from the normal, and determining the angular displacement from the normal relative to the object according to the distance signal and said time difference signal.

11. A proximity device according to claim 2, wherein an energy source within the transmitter section includes a crystal oscillator having a predetermined frequency.

12. A proximity device according to claim 2, wherein the transmitter section generates a gating control signal and wherein said receiver section further comprises:
a port for receiving the gating control signal from said transmitter section;
each of said first and second channels containing a detector section, a comparison and timer section coupled to the detector section, and a delay section coupled to the comparison and timer section, wherein each of said first and second channels receives and processes the reflected energy signal received by one of said energy sensors and thereby determine from which of the first and second energy transmitting devices and the relative time that each of the energy signals were transmitted;
means to control said first and second channels whereby a relative distance to and the angular displacement to the object or nearest a surface of the object is determined; and
means to output at least a signal for communicating said relative distance to and said angular displacement from the object or near a surface of the object.

13. A proximity device as defined by claim 12, wherein each of the delay sections within the receiver section delay processing the received reflected energy signal for a predetermined time delay.

14. A proximity device as defined by claim 12, wherein the control section within the receiver section processes said received reflected energy signal only when it is determined that said first and second channels have not received received reflected energy signal contemporaneously within said predetermined time delay.

15. A proximity device according to claim 2 wherein said energy source includes a sonic transducer and said energy sensors includes sonic receivers.

16. A proximity device as defined by claim 12, wherein the control section within the receiver section processes the reflected energy signal only when it is determined that said first and second channels has received said reflected energy signal contemporaneously within said predetermined time delay.

17. A proximity device comprising two distinct and separate transmitting sections, each of said transmitting sections positioned in a spaced apart relationship and each including a sonic transducer for transmitting a sonic energy signal; and a receiver section, the receiver section having a first and a second channel each electrically connected to at least one sonic detector and a channel control section, the receiver section for receiving a distinct signal transmitted from each of said transmitting sections and for determining therefrom the distance to an object and an angular displacement from the object relative to a normal positioned at a midpoint to a line extending between said sonic detectors, wherein said channel control section controls the first and second channels and determines the distance to and angular displacement from the source of the received energy signal only when it is determined that said channels have received said energy signal contemporaneously within a predetermined time delay.

18. A receiver for determining a distance to and angular displacement from a source of an energy signal, comprising:

at least two energy sensors;

a first and a second channel section, the first and second channel sections each comprising a detector section electrically connected to one energy sensor for detecting a signal radiated from the energy signal source, a comparison and timer section coupled to the detector section for comparing and determining the timing of the energy signal within the first and second channel, and a delay section coupled to the comparison and timer section to delay processing the energy signal for a predetermined time delay, wherein each of the first and second channels receives and processes the energy signal and the channel which received the energy signal first controls the operation of the other channel;

means for controlling the first and second channels whereby a relative distance to and an angular displacement from the signal energy source is determined; and means for outputting at least one signal for communicating the relative distance and the angular displacement.

19. The receiver defined by claim 18, further comprising means for providing a signal for directing an alignment system to track the signal energy source.

20. The receiver defined by claim 18, wherein the distance and angular displacement are only determined for an energy source radiating within a scanning range relative to the receiver.

21. A proximity device according to claim 2, wherein the distance and angular displacement are only determined for an object or nearest surface of an object falling within a scanning range relative to the proximity device.

22. A proximity device for determining a relative angular displacement from a remote energy source in accordance with a speed of propagation of signal energy radiated by the source, comprising:

a plurality of energy sensors for receiving the signal energy;

a receiver including at least a first and a second channel electrically connected to at least one of the energy sensors, each channel comprising:

(A) a channel detector for detecting and amplifying signal energy received at the channel and generating a detection signal therefrom, (B) a level comparator electrically connected to the channel detector for comparing the magnitude of the detection signal associated with each channel to a predetermined value, and generating a level signal to indicate whether the signal energy received will be recognized for processing;

(C) a timer section responsive to the level signal for generating a timing signal if the level signal indicates recognition; and (D) at least one time delay section electrically connected to the timer section and responsive to a time delay limiter signal for delaying each timing signal and generating a time delay signal to define a focal scanning range for the device, the focal scanning range utilized in determining an angular displacement from the energy source relative to a normal extending from a midpoint of a straight line connecting the energy sensors;

a channel controller electrically connected to each channel, the channel controller comprising:

(1) a time comparator for comparing each timing signal and generating a time difference signal, the time difference signal used to determine the relative angular displacement to the remote energy source if the remote source is within the focal scanning range of the device, comparing the timing and time delay signals and generating an alignment signal to direct a first channel receiving signal energy to control operation of a second channel not receiving signal energy first if the comparison determines that the second channel does not receive the signal energy before the time delay associated with the first channel runs, the time comparator also including a first counter;

(2) a time delay limiter to generate a time delay limiter signal based on the time difference signal to redefine the time delay within each time delay section thereby manipulating the focal scanning range, the time delay limiter signal generated if the second channel receives signal energy before the time delay associated with the first channel receiving signal energy runs;

(3) a position detector for detecting a position of the signal energy source in accordance with the focal scanning range and generating a positional signal therefrom; and (4) an angular determiner for determining the angular displacement of the signal energy source if the source lies within the focal scanning range and generating a displacement signal therefrom; and communication means responsive to said alignment, positional and displacement signals for outputting the same.

23. A proximity device as defined by claim 22, further comprising:

a transmitter for generating at least one energy signal;

at least one energy transmitting device electrically connected to the transmitter for outputting the energy signal;

a gating signal generator for generating a gating signal, the gating signal identifies a start time at which the energy signal is output, a blanking time period within which to blank the receiver during the time for which the energy signal is output and a time window within which the receiver is responsive;

a first oscillator within the channel controller for generating a first oscillator signal for determining the distance between an object reflecting a portion of the energy signal and any of the energy sensors;

a second counter within the timer section responsive to said gating signal for generating a distance signal based on a time lapse between the time of output of the energy signal and the receipt of signal energy by a channel, the signal energy being a portion of signal energy reflected from the object; and a second oscillator for generating a second oscillator signal at a variable frequency within the channel controller, whereby the number of cycles of the second oscillator signal are counted by the first counter for the duration of the time difference signal to allow the determination of a distance from the normal to the object and an angular displacement from the object relative to the normal.

24. A proximity device defined by claim 22, further comprising an alignment system electrically coupled to the device for receiving the alignment signal and directing the device to track and follow the source of the signal energy if the position of the source indicates that the source does not lie within the focal scanning range of the device.

25. A proximity device defined by claim 23, further comprising an alignment system electrically coupled to the device for receiving the alignment signal and directing the device to track and follow the object if the energy reflected indicates that the object does not lie within the focal scanning range of the device.

26. A proximity device defined by claim 22, wherein the time delay section determines a displacement angle B defining outer boundaries of the focal scanning range, displacement angle B equal to the sum of a positive angle $\Gamma$ varying from 0° to 90° relative to the normal and a positive angle $\Gamma'$ varying from 0° to 90° in a direction opposite to $\Gamma$, relative to the normal, where $\Gamma$ and $\Gamma'$ are defined by time delay signals generated within the time delay sections associated with each channel.

27. A proximity device defined by claim 26, wherein the time delay section further includes switching means for switching between predetermined time delays such that the time delay may be varied to vary the displacement angle.

* * * * *